United States Patent
Wigren

(10) Patent No.: US 7,983,187 B2
(45) Date of Patent: Jul. 19, 2011

(54) LOAD ESTIMATION IN RECEIVER DIVERSITY TELECOMMUNICATION SYSTEMS

(75) Inventor: Karl Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

(21) Appl. No.: 12/600,671

(22) PCT Filed: May 22, 2007

(86) PCT No.: PCT/SE2007/050345
§ 371 (c)(1),
(2), (4) Date: Nov. 20, 2009

(87) PCT Pub. No.: WO2008/143562
PCT Pub. Date: Nov. 27, 2008

(65) Prior Publication Data
US 2010/0165860 A1 Jul. 1, 2010

(51) Int. Cl.
*G01R 31/08* (2006.01)
*H04B 7/185* (2006.01)
*H04B 7/216* (2006.01)
*H04B 7/00* (2006.01)

(52) U.S. Cl. ......... 370/252; 370/318; 370/320; 455/522

(58) Field of Classification Search .................. 370/230, 370/252, 254, 255, 317, 318, 320, 332, 333, 370/334, 335, 342, 441; 455/63.11, 67.11, 455/67.13, 114.2, 226.2, 278.1, 283, 296, 455/423, 522
See application file for complete search history.

(56) References Cited

U.S. PATENT DOCUMENTS

| 6,671,512 | B2* | 12/2003 | Laakso | 455/453 |
| 7,738,412 | B2* | 6/2010 | Hamalainen et al. | 370/318 |
| 2002/0115459 | A1* | 8/2002 | Chuang et al. | 455/522 |
| 2009/0262658 | A1* | 10/2009 | Kondo | 370/252 |
| 2011/0021239 | A1* | 1/2011 | Wakabayashi et al. | 455/522 |

FOREIGN PATENT DOCUMENTS

| WO | 2006/076969 A1 | 7/2006 |
| WO | 2006/118498 A1 | 11/2006 |
| WO | 2007/024166 A1 | 3/2007 |
| WO | 2007/055626 A1 | 5/2007 |

OTHER PUBLICATIONS

Wigren, T. et al. "Estimation of Uplink WCDMA Load in a Single RBS." 2007 IEEE 66th Vehicular Technology Conference (VTC-2007 Fall), Sep. 30-Oct. 3, 2007, pp. 1499-1503.
Lundin, E. G. et al. "Uplink Load Estimates in WCDMA with Different Availability of Measurements." 57th IEEE Vehicular Technology Conference (VTC 2003-Spring), Apr. 22-25, 2003, vol. 2, pp. 1198-1202.

* cited by examiner

*Primary Examiner* — Kwang B Yao
*Assistant Examiner* — Tung Q Tran
(74) *Attorney, Agent, or Firm* — Coats & Bennett, P.L.L.C.

(57) ABSTRACT

Methods and arrangements for providing load reference data in a CDMA wireless communication system with receiver diversity are presented. The method comprises measuring (210) of received total wideband power for more than one receiver branch. Probability distributions for a respective power quantity are estimated (212), related to selected state variables of an estimation algorithm, from quantities representing the measured powers using selected measurement functions of the selected state variables of the estimation algorithm. The selected state variables correspond to cell power quantities and the selected measurement functions correspond to the quantities representing the measured powers. A conditional probability distribution of noise floor measures for the respective branches are computed (214) based on the estimated probability distributions. The method ends with provision (216) of load reference data based on the computed conditional probability distributions of the noise floor measures.

20 Claims, 12 Drawing Sheets

LOAD ESTIMATION IN RECEIVER DIVERSITY TELECOMMUNICATION SYSTEMS

TECHNICAL FIELD

The present invention relates in general to methods and devices for load estimation in cellular communication systems and in particular to cellular communication systems utilizing receiver diversity.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink traffic. It is well known that existing users of the cell all contribute to the interference level in the uplink of WCDMA systems. Further, terminals in neighbour cells also contribute to the same interference level. This is because all users and common channels of a cell transmit in the same frequency band when Code Division Multiple Access (CDMA) technology is used. The load of the cell is directly related to the interference level of the same cell.

In order to retain stability of a cell, and to increase the capacity, fast enhanced uplink scheduling algorithms operate to maintain the load below a certain level. The reason is that the majority of uplink user channels, at least in WCDMA, are subject to power control. This power control aims at keeping the received power level of each channel at a certain signal to interference ratio (SIR), in order to be able to meet specific service requirements. This SIR level is normally such that the received powers in the radio base station (RBS) are several dB's below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. However, in case a high capacity channel would suddenly appear, the raise in the interference could lead to an instability, a so called power rush. This explains why it is a necessity to schedule high capacity uplink channels, like the enhanced uplink channel in WCDMA, so that instability is avoided. In order to do so, the momentary load must be estimated in the RBS or any node connected thereto. This enables the assessment of the capacity margin that is left to the instability point.

The load of a cell in e.g. a CDMA system is usually referred to some quantity related to power, typically noise rise or the rise over thermal (RoT). Power quantities, such as total power level and noise floor (ideally thermal noise), have to be determined. Determinations of highly fluctuating power quantities or noise floor according to prior art is typically associated with relatively large uncertainties, which even may be in the same order of magnitude as the entire available capacity margin. It will thus be very difficult indeed to implement enhanced uplink channel functionality without improving the load estimation connected thereto.

A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor.

At this point it could be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the interference below a specific level. This means that load estimation is important also for coverage. In particular load estimation is important from a coverage point of view in the fast scheduling of enhanced uplink traffic in the RBS. Furthermore, the admission control and congestion control functionality in the radio network controller (RNC) that controls a number of RBS's also benefits from accurate information on the momentary noise rise of the cell.

One approach to improve load estimation is disclosed in the published international patent application WO 2006/076969. A minimum value of a power quantity, preferably a difference between the instantaneous total received wideband power and the instantaneous sum of powers of all links used in the same cell, is used as an estimate of an upper limit of the thermal noise floor. An optimal and soft algorithm for noise rise estimation based on a similar basic idea of minimum values is disclosed in the published international patent application WO 2007/024166. Complexity reduction procedures concerning such algorithms are further disclosed in the published international patent application WO 2007/055626.

Admission control makes sure that the number of users in a cell does not become larger than what can be handled, in terms of hardware resources and in terms of load. A too high load first manifests itself in too poor quality of service, a fact that is handled by the outer power control loop by an increase of the SIR target. In principle this feedback loop may also introduce power rushes, as described in the previous section.

The admission control function can prevent both the above effects by regulation of the number of users and corresponding types of traffic that is allowed for each cell controlled by the RNC.

In order to regulate the number of users the RNC needs to have means for computation of a measure of the load of a cell. This measure of the load of the cell is then compared to a threshold, and new users are accepted if the load of the cell is predicted to remain below the threshold, after the tentative addition of the new user. An improved load measure for the admission control function is requested, so that a higher number of users can be accepted, without sacrificing cell stability limits.

One approach for increasing the useful capacity is to utilize different kinds of receiver diversity. By using more than one receiver branch, radio signals that are not entirely correlated can be achieved. MIMO (multiple-input-multiple-output) and diversity combining algorithms combine the signals from several receiver branches, in order to enhance the overall performance of the receiver. Some, but not all, combining methods implicitly assume that the receiver branches are power balanced, i.e. calibrated. The problem of calibration of time is at least equally important and has received a substantial amount of attention. That problem is however beyond the scope of the present invention disclosure.

The relevance of a correct power balance, i.e. a correct power calibration, is evident when considering fusion of two received signals. Two signals with the same signal-to-noise ratio, where one of the signals has a significantly reduced amplitude as compared to the second signal, caused e.g. by an un-calibrated receiver chain, are not easily combined. In case the receiver scale factor errors are not corrected for, the combined signal will evidently suffer from degradation.

To handle the above calibration problem, channel estimation can be applied individually for each receiver branch. In that way, any unknown scale factor errors of the receiver chain are incorporated into the channel model of each receiver branch. Note that this approach would require the use of a training sequence, and a successful decoding in case decision feedback is applied for channels estimation, e.g. jointly with turbo decoding. Such approaches are, however, complex.

SUMMARY

A general object of the present invention is to provide improved methods and devices for load estimation in CDMA wireless communication system with receiver diversity. A further object is to utilize inherent correlation between individual receiver branches, while still estimating separate noise floor levels for the different branches.

The above objects are achieved by methods and arrangements according to the enclosed patent claims. In general words, in a first aspect, a method for providing load reference data in a CDMA wireless communication system with receiver diversity is presented. The method comprises measuring of received total wideband power for at least a first receiver branch and a second receiver branch at a plurality of times. The method further comprises estimating, a plurality of times, of a probability distribution for a first power quantity and a second power quantity, both being related to selected state variables of an estimation algorithm, from quantities representing the measured received total wideband power of the first receiver branch as well as of the second receiver branch using selected measurement functions of the selected state variables of the estimation algorithm. The selected state variables correspond to cell power quantities and the selected measurement functions correspond to the quantities representing the measured received total wideband power of the first and second receiver branches. A conditional probability distribution of a first noise floor measure is computed based on at least a number of the estimated probability distributions for the first power quantity, and a conditional probability distribution of a second noise floor measure based on at least a number of the estimated probability distributions for the second power quantity. The method ends with provision of load reference data based on the computed conditional probability distributions of the first and second noise floor measures.

In a second aspect, a method for admission control in a CDMA wireless communication system with receiver diversity comprises providing of load reference data according to the first aspect and controlling of admission based on the load reference data.

In a third aspect, a method for enhanced uplink scheduling in a CDMA wireless communication system with receiver diversity comprises providing of load reference data according to the first aspect and scheduling of enhanced uplink traffic based on the load reference data.

In a fourth aspect, a method for receiver branch calibration in a CDMA wireless communication system with receiver diversity comprises providing of load reference according to the first aspect and calculating of a compensation measure representing a difference in thermal noise power floor between the first and second receiver branch.

In a fifth aspect, a method for multiple-input-multiple-output processing in a CDMA wireless communication system with receiver diversity comprises performing receiver branch calibration according to the fourth aspect and processing of a joint multiple-input-multiple-output channel model of the first and second receiver branch.

In a sixth aspect, an arrangement for providing load reference data of a CDMA wireless communication system with receiver diversity is presented. The arrangement comprises means for obtaining at least quantities representing measures of received total wideband power for a first receiver branch at a plurality of times and quantities representing measures of received total wideband power for a second receiver branch at the plurality of times. The arrangement further comprises means for estimating, a plurality of times, a probability distribution for a first power quantity and a second power quantity. The means for estimating is connected to the means for obtaining quantities representing measures. The means for estimating is arranged to operate with selected state variables of an estimation algorithm corresponding to cell power quantities, and with selected measurement functions corresponding to quantities representing the measured received total wideband power of the first receiver branch as well as of the second receiver branch. The first and second power quantities are related to the selected state variables, and therefore, the means for estimating is arranged for estimating the probability distributions for the first and second power quantities using the selected measurement functions. The arrangement also comprises means for computing a conditional probability distribution of a first noise floor measure and a conditional probability distribution of a second noise floor measure. The means for computing is connected to the means for estimating. The means for computing is arranged to operate on at least a number of the estimated probability distributions for the first power quantity and at least a number of the estimated probability distributions for the second power quantity. Finally, the arrangement comprises means for providing load reference data based on the computed conditional probability distributions of the first and second noise floor measures. The means for providing load reference data is connected to at least the means for computing.

In a seventh aspect, an admission control arrangement in a CDMA wireless communication system with receiver diversity comprises an arrangement for providing load reference data according to the sixth aspect and an admission control unit connected to the means for providing load reference data.

In an eight aspect, an enhanced uplink scheduling arrangement in a CDMA wireless communication system with receiver diversity comprises an arrangement for providing load reference data according to the sixth aspect and an enhanced uplink scheduling unit connected to the means for providing load reference data.

In a ninth aspect an arrangement for receiver branch calibration in a CDMA wireless communication system with receiver diversity comprises an arrangement for providing load reference data according to the sixth aspect and means for calculating a compensation measure representing a difference in thermal noise power floor between the first and second receiver branch.

In a tenth aspect, an arrangement for multiple-input-multiple-output processing in a CDMA wireless communication system comprises an arrangement for receiver branch calibration according to the ninth aspect and a processor arranged for processing a joint multiple-input-multiple-output channel model of the first and second receiver branch.

In an eleventh aspect, a node of a CDMA wireless communication system with receiver diversity comprises an arrangement according to the sixth aspect.

In a twelfth aspect, a CDMA wireless communication system with receiver diversity comprises an arrangement according to the sixth aspect.

One advantage with the present invention is that an enhanced performance in MIMO/Rx diversity configurations is achieved, by joint processing of power measurements of all receiver branches. Another advantage is that front end receiver power balancing requirements between receiver branches are eased, which in turn enables the use of analogue components with less stringent performance. All this results in a lower RBS cost.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
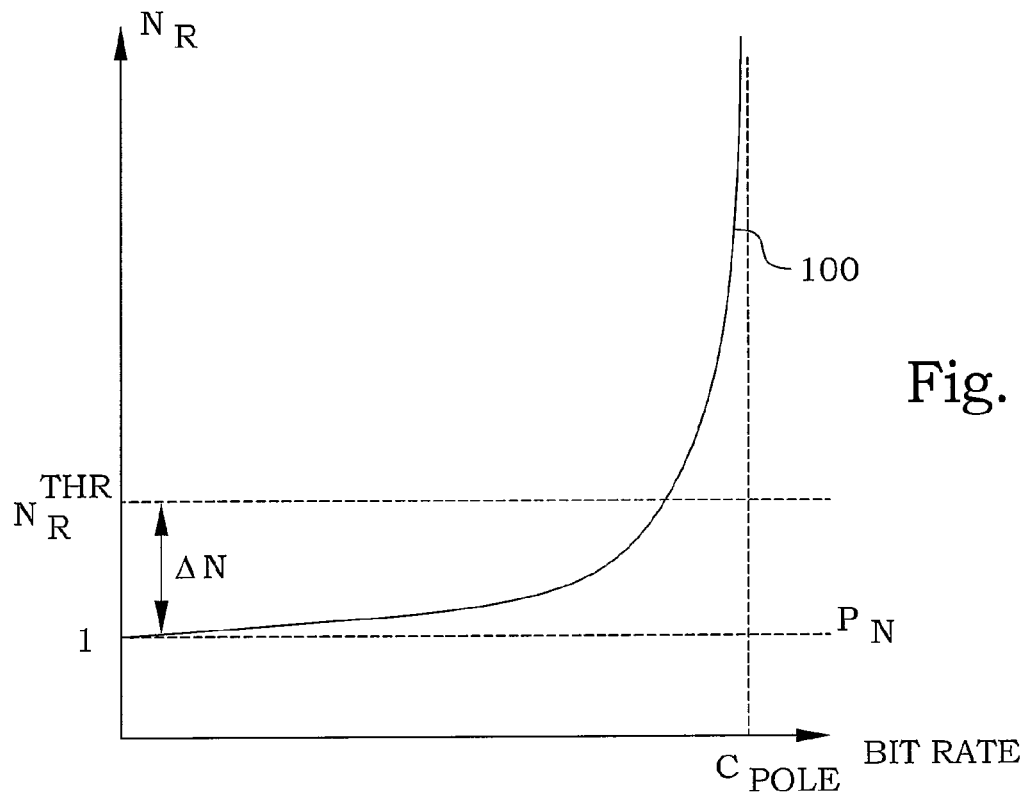
FIG. 1 is a diagram illustrating conditions concerning load estimation.

Throughout the entire disclosure, bold letters in equations refer to vector or matrix quantities.

In the drawings, corresponding reference numbers are used for similar or corresponding parts.

The present detailed description benefits from a somewhat deeper understanding about how to perform load estimation and the problems connected thereto. Descriptions about reference and measurement points, power measurements, power control loops, noise rise, observability of noise floor, and noise rise estimations are found in WO 2007/024166 and are in a general sense also applicable to the present disclosure.

A first brief overview of load estimation in systems without explicit receiver diversity is given.

FIG. 1 is a diagram illustrating conditions concerning load estimation. Noise rise $N_R$, defined as the ratio between a total power and the thermal noise level $P_N$ as measured at the antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and scheduling of additional channels can be performed once the instantaneous noise rise $N_R$ has been determined. The pole capacity, $C_{pole}$ denotes the maximum bitrate capacity in bits per second. A typical difference $\Delta N$ between the threshold $N_R^{thr}$ and the level defined by the thermal noise level $P_N$ is typically 7 dB. However, the noise floor or thermal noise level $P_N$ is normally not available with sufficient accuracy.

Figure 2:
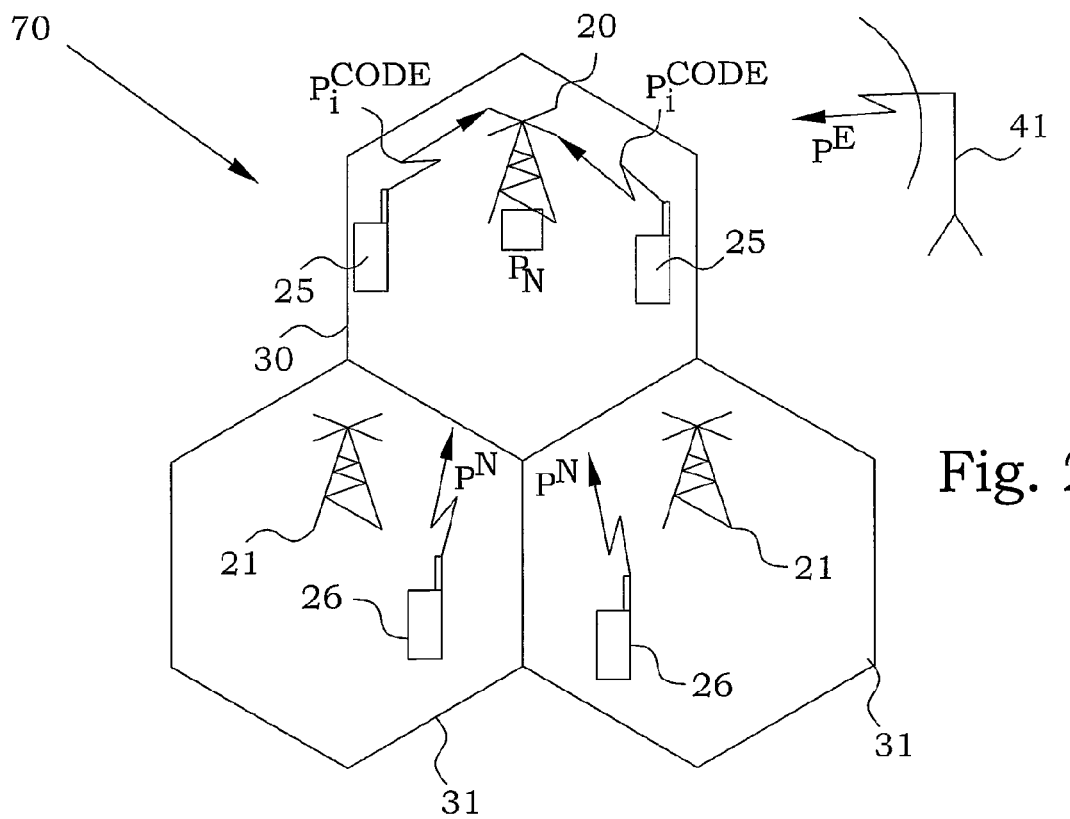
FIG. 2 illustrates the contributions to power measurements in connection with an RBS.

FIG. 2 illustrates the contributions to power measurements in connection with an RBS 20. The RBS 20 is associated with a cell 30. Within the cell 30, a number of mobile terminals 25 are present, which communicate with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term, denoting the noise floor power, arises from the receiver itself.

A total wide band power measurement $P_{Measurement}^{RTWP}(t)$ can be expressed by:

$$P_{Measurement}^{Total}(t) = \sum_{i=1}^{n} P_i^{Code}(t) + P^{E+N}(t) + P_N(t) + e^{Total}(t), \quad (1)$$

where $$P^{E+N} = P^E + P^N, \quad (2)$$

and where $e^{RTWP}(t)$ models measurement noise.

It can be mathematically proved that a linear estimation of $P^{E+N}(t)$ and $P_N$ is not an observable problem. Only the sum $P^{E+N} + P_N$ is observable from the available measurements.

The principle used in WO 2007/024166 for estimation of the thermal noise power floor is to estimate it as a minimum of a measured or estimated power quantity. The power in question is preferably either the sum of the power of the noise floor and the power of neighbour and external interference, or the total received wideband power. The estimate of the thermal noise power floor obtained by the above ideas is always biased to be higher than the true value. This follows since the sum of thermal noise floor power, neighbour cell WCDMA power and non-WCDMA in-band interference power is always at least as great as the thermal noise power floor itself. A consequence of this is that the noise rise is underestimated, i.e. the load of the cell is underestimated. The consequence could be too aggressive scheduling, leading e.g. to cell instability.

Figure 3:
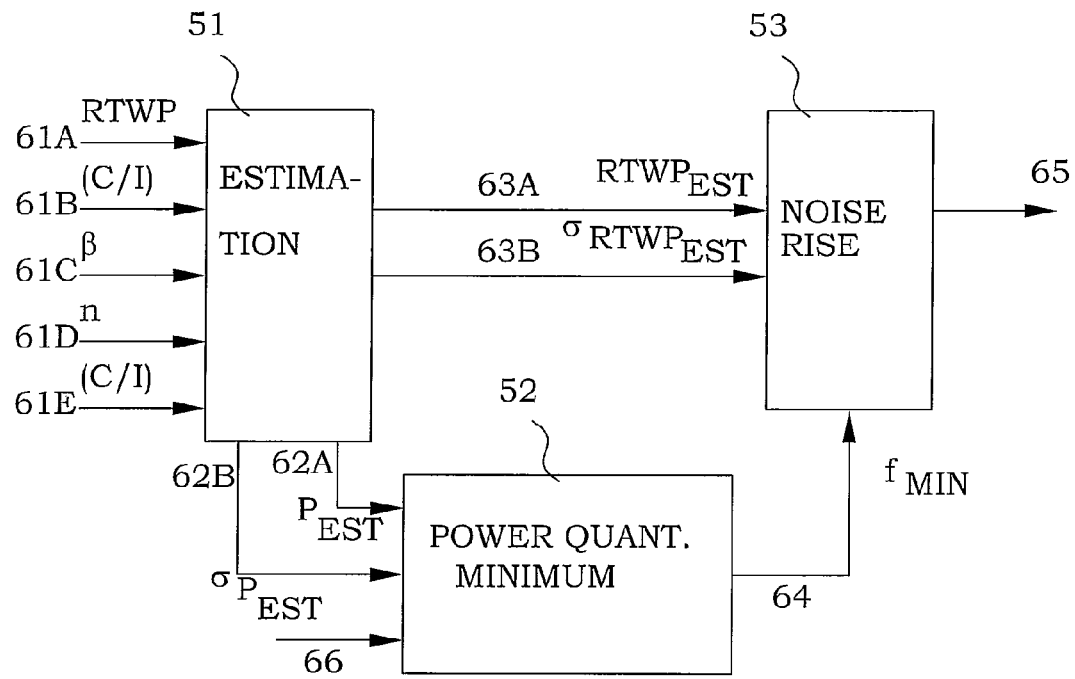
FIG. 3 is a block scheme of an embodiment of an arrangement for provision of load reference data.

With reference to FIG. 3, an embodiment of another possible solution provides a different principle, based on soft estimation of the thermal noise power floor and the noise rise. In the most advanced form, the possible noise rise estimation is performed in three main blocks 51, 52, 53.

The first block 51, i.e. the power estimation block, applies an estimation algorithm for estimation of certain power quantities that are needed by subsequent processing blocks. In the present embodiment, the estimation is a so-called extended Kalman filter. Specifically, the block 51 receives a number of inputs 61A-E comprising the measured received total wideband power (RTWP) 61A, measured code power to interference ratio (C/I) of channel i 61B, beta factors for channel i 61C, number of codes for channel i 61D, corresponding to code power to interference ratio commanded by a fast power control loop 61E, and provides outputs comprising power estimates 62A, 63A and corresponding standard deviations 62B, 63B. The output 62A is an estimate of a power quantity being the sum of neighbor cell WCDMA interference power, in-band non-WCDMA interference power and thermal noise floor power, and the output 63A is the estimated received total wideband power (RTWP) and the output 63B is the corresponding variance. Together with the estimated mean values of the power quantities, the variances of the power quantities define estimated probability distribution functions (PDF's) of the power quantities. When the outputs are from an extended Kalman filter arrangement, these parameters are the only ones needed to define the estimated (approximate) Gaussian distributions that are produced by the filter. Thus, enough information is given to define the entire probability distribution information of the power estimates. The main scope of the present invention focuses on problems associated with this block 51.

A second block 52 applies in the present embodiment Bayesian estimation techniques in order to compute a conditional probability density function of an extreme value 64 of one of the above mentioned power quantities. The estimation is based on a number of estimated probability distributions from the first block 51. Parameters 66 giving information about a prior expected probability distribution of the noise floor power is in the present embodiment provided to the conditional probability distribution estimation block 52, in order to achieve an optimal estimation.

A third block 53 performs noise rise estimation. In the present embodiment, this is performed by a calculation of the conditional probability distribution of the quotient of the momentary estimated RTWP distribution 63A, 63B from block 51, and the conditional probability distribution of the noise power floor 64. The noise rise estimate 65 is preferably computed as a conditional mean of the conditional probability distribution of the quotient.

MIMO radio techniques divide/mix incoming bit streams into one separate stream for each transmitting branch. These branches are preferably design so that the transmitted multiple bit streams are as uncorrelated as possible at the receiving receiver branches. This can e.g. be accomplished with the use of different polarization and/or by using transmitting branches that are located at different enough locations (spatial diversity). The advantage of the MIMO concept is that if the correlation between bit streams is sufficiently low at the receiving end, the capacity can be increased by a factor equal to the number of transmitting branches. This is due to the fact that each transmitting branch can be viewed as a separate channel, exploiting the complete spectral bandwidth of the allocated channel. The technical challenge is to make sure that the transmitted bit streams remain uncorrelated at the receiving end, at the same time as the physical size of the antenna is kept small enough. This can be very tricky in a small handheld terminal, although polarization diversity appears to be promising in such applications.

In order to fully exploit the MIMO concept, a large number of dedicated radio algorithms have been developed. Now, an important pre-requisite for the use of MIMO processing schemes is a model of the involved channels. Typically, these channel models need to be created individually for each MIMO branch. The reason for this is that component variations result in scale factor variations (for the power) between the receiver branches of more than a dB.

An alternative would be to calibrate the receiver branches and compute channel models by processing of all measurements simultaneously. It can be expected that such a procedure would be more efficient, e.g. since more prior information is available, i.e. the receiver branches are calibrated. Such calibration is however costly.

The load estimation techniques of WO 2007/024166 are possible to apply also in cases of receiver diversity and MIMO. According to the present invention, the load estimation is not performed separately per branch, but instead in a common processing of power quantities of all branches, however, still providing noise floor estimates for the individual branches. In receiver diversity applications and MIMO, the receiver branches are ideally uncorrelated to each other. In reality, however, a certain degree of correlation remains. By use of the present invention, this correlation can be exploited for enhancement of the estimation of the load. More particularly, the correlation enhances the estimation of the so called residual power by using a more general filter structure than used before. The correlation is then modelled by the introduction of correlation in the joint systems noise covariance matrix.

Figure 4:
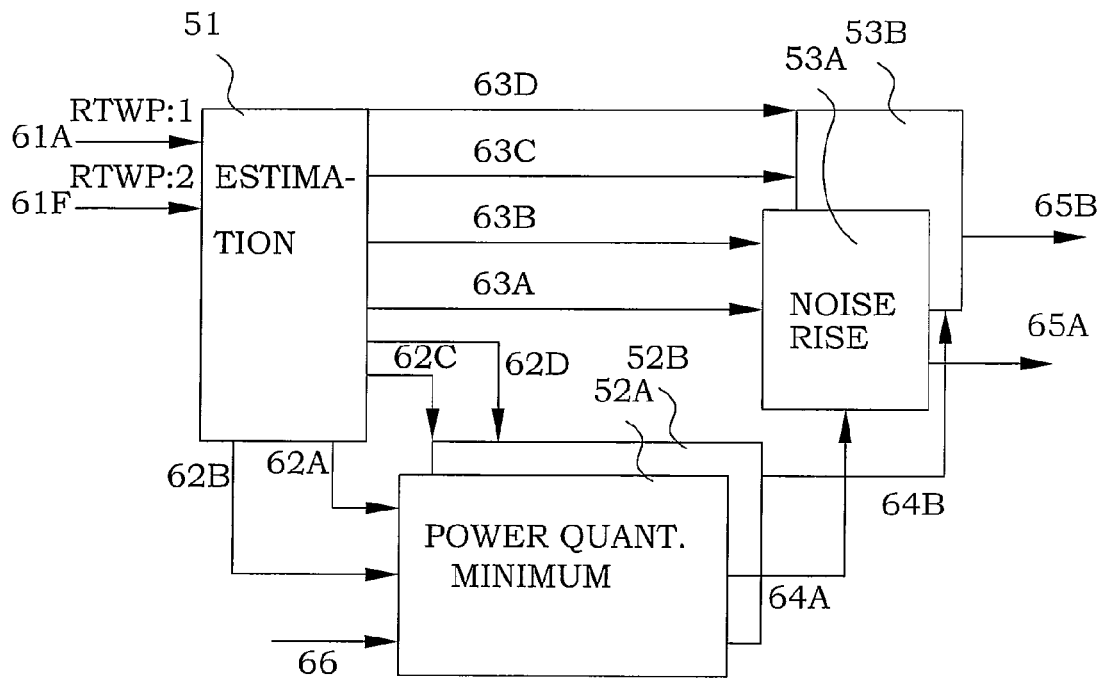
FIG. 4 is a block scheme of an embodiment of an arrangement for provision of load reference data in a system having receiver diversity according to the present invention.

FIG. 4 illustrates one embodiment of a soft estimation of the thermal noise power floor and the noise rise according to the present invention. In this embodiment, two receiver branches are present. Specifically, the block 51 receives inputs 61A, 61F comprising the measured received total wideband power (RTWP) for the first receiver branch 61A and the RTWP for the second receiver branch 61F. The estimation the extended Kalman filter in block 51 is thus based on inputs for both receiver branches. The Kalman filter provides outputs comprising two sets of power estimates 62A, 63A, 62C, 63C and corresponding standard deviations 62B, 63B, 62D, 63D. The output 62A is as above an estimate of a power quantity associated with the first receiver branch. The output 62C is an estimate of a power quantity associated with the second receiver branch. The output 63A is as above the estimated received total wideband power (RTWP) of the first receiver branch and the output 63C is the estimated received total wideband power (RTWP) of the second receiver branch. The power estimate 62A and the standard deviation 62B are provided to a second block 52A associated with the first receiver branch. The power estimate 62C and the standard deviation 62D are provided to a second block 52B associated with the second receiver branch. Each of the second blocks 52A and 52B performs the functionalities as described in connection with FIG. 3.

In the same way, each of the second blocks 52A and 52B output a respective extreme value 64A, 64B of the power quantities associated with the power estimates 62A and 62C, respectively. These extreme values 64A, 64B are provided to a respective third block 53A and 53B. The third blocks 53A and 53B also receive the respective RTWP estimate 63A and 63C and the associated standard deviations 63B and 63D. The third blocks 53A and 53B uses these inputs for providing a respective noise rise measure 65A and 65B.

It can be noticed, that the blocks 52A, B and 53A, B operate separately, i.e. each of them operates in the same manner as in the arrangement of FIG. 3. However, the first block 51 is a common block, where, in the present embodiment, the extended Kalman filter encompasses all input measurements and is designed to model also the remaining correlations between the different receiver branches. By having one initial common block and successive separate blocks thus gives the arrangement of FIG. 4 advantages compared with prior art solutions.

In FIG. 4, only RTWP measurements are indicated as inputs to the first block 51. However, other power-related measurements and information can also be utilized in order to achieve a better estimation of a power quantity corresponding to a sum of neighbor cell WCDMA interference power, in-band non-WCDMA interference power and thermal noise floor power. This in turn improves the noise floor estimation. It is thus possible to use e.g. inputs as in FIG. 3, but for both receiver branches. Another alternative is to use additional measures of received scheduled enhanced uplink power, RSEPS, as input to the estimator. The estimated power quantity provided to the second blocks 52A and 52B could then preferably be related to the difference between the RTWP and the RSEPS for each receiver branch. Variants of handling the nonlinear measurement then preferably have to be specified. The modeling of power dynamics is also preferably enhanced, to general dynamics as compared to the random walk modelling previously exploited. Adaptive spectral estimation is included in the front end, for estimation of such general dynamics.

In an alternative embodiment, a common RSEPS value for all receiver branches can be used. Such a common RSEPS value can be constituted e.g. by the RSEPS of one of the branches, an average value for all branches or dependent on at least one branch RSEPS value according to some other relation. The common RSEPS value can then be utilized for estimating the power quantities for the different receiver branches.

The general ides above can not only be exploited for providing noise rise measures, as in the embodiment of FIG. 4, but can be utilized in different aspects in a CDMA wireless communication system with receiver diversity. In a method for admission control in a CDMA wireless communication system with receiver diversity load reference data is provided according to the above principles and admission is controlled based on this load reference data. Similarly, in a method for enhanced uplink scheduling in a CDMA wireless communication system with receiver diversity load reference data is provided according to the above principles and enhanced uplink traffic is scheduled based on this load reference data. A joint front end processing can thus be performed for load estimation purposes when MIMO or uplink Rx diversity receiver chains are fully exploited. These ideas therefore enhances the RNC admission control function and enhanced uplink scheduling, for the cases where an uplink MIMO (multiple-input-multiple-output) or Rx diversity receiver chain is employed. These applications are mainly applicable for WCDMA and CDMA cellular systems.

Enhancements of the measurement standards in e.g. WCDMA, in which new measurement and corresponding measurement reports are defined for enhanced uplink powers. The basic receiver wideband power measurement is hence augmented by an additional measurement that collects all enhanced uplink power into one chunk. This agrees perfectly with the proposed approach for load reference data provision. One advantage of the present aspect is that when the receiver branches are correlated, this correlation can be fully exploited for enhancement of the estimation of the so called residual power, using a more general Kalman filter structure. The correlation is then modelled by the introduction of correlation in the joint systems noise covariance matrix. The present invention hence gives a performance enhancement. The performance enhancement should directly be noticeable as an enhanced overall capacity of CDMA and WCDMA systems.

Moreover, more diversity related actions may also benefit from the provision of load reference data according to the above principles. The present invention also provides means for solving the calibration problem in a receiver diversity system by the provision of an on-line algorithm for soft estimation of the thermal noise floor, of each receiver branch. The thermal noise level of the different receiver branches can then be normalized using these estimated levels, i.e. the receiver branches can be calibrated. This enables the use of the alternative MIMO processing and channel estimation schemes discussed in the background section.

To this end, an on-line, low complexity algorithm for joint estimation of the thermal noise power floor of each uplink receiver branch, of a MIMO or Rx diversity receiver of a WCDMA (or CDMA) cellular system is provided. It exploits input measurements in the form of discretized analogue total wideband power measurements at any point of the receiver chain. The point is the same for all receiver branches. Thermal noise power floor estimates are provided for each receiver branch, exploiting the above discussed correlation between receiver branches, by means of using the systems noise covariance matrix. The thermal noise power floor estimates are provided to a calibration algorithm, where compensation values are calculated. The compensation values may then be applied to the incoming signal of each receiver branch, resulting in digitized receiver power streams of each branch with approximately the same thermal noise floor. In other words, a calibrated MIMO/Rx diversity radio receiver is achieved. An automatic power calibration is thereby enabled for MIMO/Rx-diversity antenna and receiver structures. As a consequence, new and better algorithms for MIMO channel estimation and processing should become possible in a future in that more accurate prior information can be assumed.

One important part of the present invention is the estimation of the thermal noise power floor. For load estimation purposes, the measure is the rise over thermal, as measured at the antenna connector. Hence, the main source of error between receiver branches in this case is likely to be scale factor errors due to component variations, from the antenna in to the digital receiver. Noise may also be added. Anyway, in this case the estimation of the thermal noise power floor, as seen in the digital receiver, appears to be the key component.

For the MIMO calibration problem, the proposed algorithm achieves a normalization of the thermal noise power floor levels between receiver branches, thereby tracking and normalizing varying receiver temperatures between receiver branches. This captures both varying antenna receiver noise temperature and signal conditioning effects from the antenna element to the digital receiver.

An embodiment of a general state space modeling is now described. A joint block state space model is created. The generic state space model that is used to describe the powers of the cell used in the noise rise estimator is:

$$x(t+T)=a(x(t))+w(t)$$

$$y(t)=c(x(t))+e(t). \quad (3)$$

Here x(t) is a state vector consisting of various powers of relevance to a specific cell. In particular, x(t) contains one block of power states for each receiver branch. y(t) is an output vector consisting of the power measurements performed in the cell (e.g. the total received wideband power, RTWP). Also y(t) contains one measurement block for each receiver branch. w(t) is the so called systems noise that represents the model error, and e(t) denotes the measurement error. Both these quantities contain one block for each receiver branch. a(x(t)) describes the, possibly nonlinear, dynamic modes, while the vector c(x(t)) is the, possibly nonlinear, measurement vector, which is a function of the states of the system. Finally t represents the time and T represents the sampling period. In the following, specializations will be introduced to quantify the detailed aspects of embodiments of the current invention.

A method for providing load reference data in a CDMA wireless communication system with receiver diversity thus comprises measuring of at least a received total wideband power for at least a first receiver branch and a second receiver branch at a plurality of times. A probability distribution for a first power quantity and a second power quantity, both being related to selected state variables of an estimation algorithm, are estimated a plurality of times. The estimations thus emanates from quantities representing the measured received total wideband power of the first receiver branch as well as of the second receiver branch using selected measurement functions of the selected state variables of the estimation algorithm. A conditional probability distribution of a first noise floor measure is computed, based on at least a number of the estimated probability distributions for the first power quantity. Similarly, a conditional probability distribution of a second noise floor measure is computed, based on at least a number of said estimated probability distributions for said second power quantity. Load reference data is then provided based on the computed conditional probability distributions of the first and second noise floor measures.

States and receiver branch blocks are to be defined. The selected state variables are defined to correspond to cell power quantities. A detailed embodiment where both RTWP and RSEPS measurements are available is described in Appendix A. Correlation properties between receiver branches, e.g. regarding spatial and polarization correlation effects have to be included. The estimation algorithm comprises preferably a joint system noise covariance modeling correlation between the different receiver branches. The joint system noise covariance comprises more preferably at least one of spatial diversity covariance and polarization diversity covariance. This is also exemplified in Appendix A.

The next step is to discuss the second equation of (3), i.e. the available measurement alternatives. The selected measurement functions correspond at least to the quantities representing the measured received total wideband power of the first and second receiver branches. Different measurement alternatives, based on both RTWP and RSEPS measurements are discussed more in detail in Appendix B.

As mentioned further above, the method could also be based on power measurements in a more general sense. For load estimation purposes, the code powers of each channel of the own cell can be exploited, at the price of a Kalman filter with a very high order. The treatment of WO 2007/024166 and complexity reductions of WO2007/055626 can be generalized along the lines of the present invention disclosure as briefly described here below.

The RSEPS state block, of each receiver branch, are replaced with code power blocks, one block for each channel of the cell. Each code power state block has its own individual modelling of dynamics and systems noise covariance. The RSEPS measurement equations, of each receiver branch, are replaced with one code power measurement for each channel of the own cell.

The modelling alternatives in Appendix B may need to additions to cover e.g. SIR measurement definitions from which code powers can be derived. The details are omitted.

The treatment in Appendix A and B was based on the choice of the RSEPS and residual powers as the "main" states. However, the state selection is in fact arbitrary—the only thing that matters is that the dynamics and the measurement equations of (3) are consistently defined. This is further discussed in Appendix C.

All quantities have now been defined and the extended Kalman filter can be applied with any combination of state model and measurement model according to the appendices A, B and C. The general extended Kalman filter is presented in Appendix D.

Figure 5:
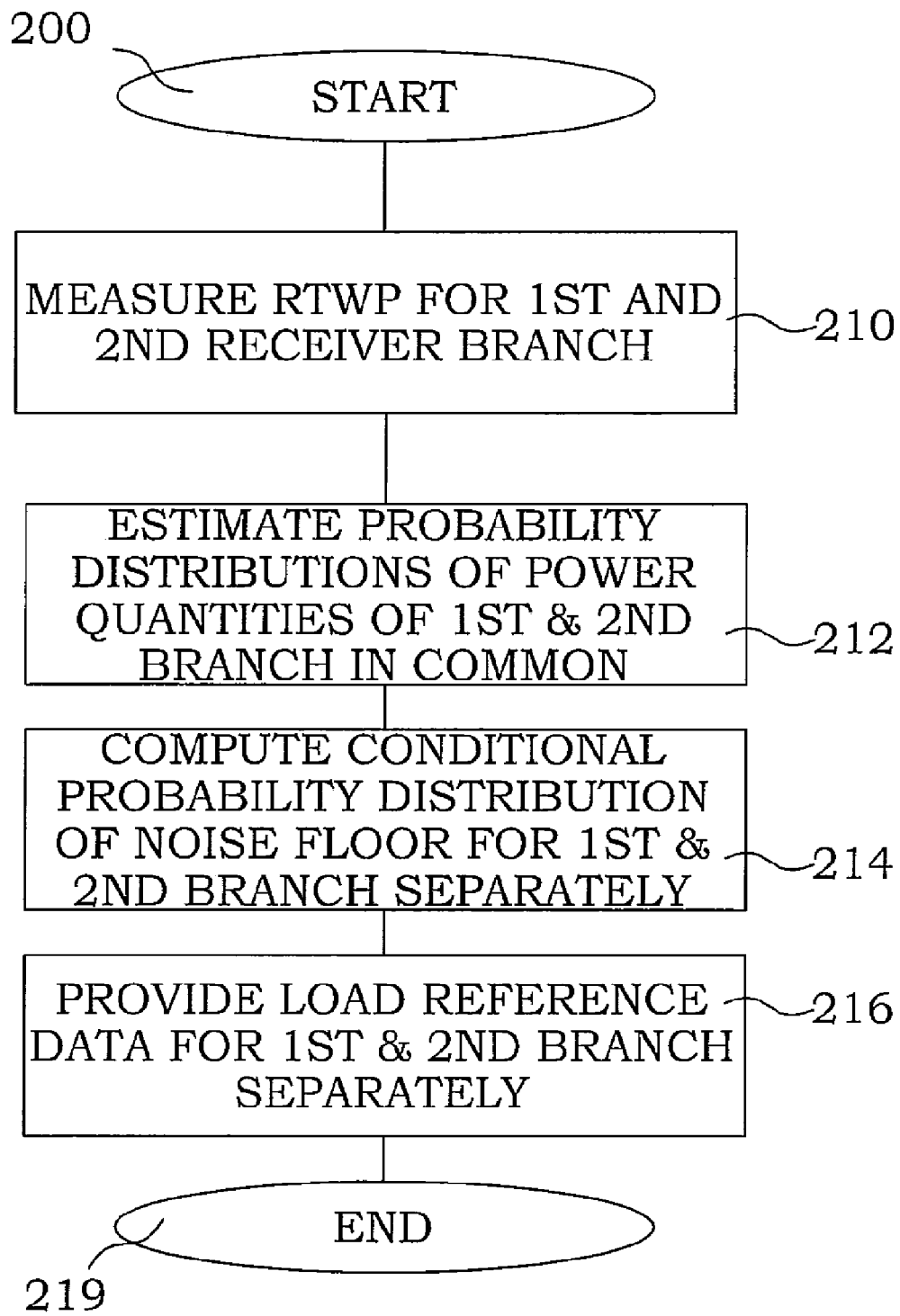
FIG. 5 is a flow diagram of steps of an embodiment of a method for providing load reference data according to the present invention.

FIG. 5 illustrates a flow diagram of steps of an embodiment of a method for providing load reference data according to the present invention. The method for providing load reference data in a CDMA wireless communication system with receiver diversity starts in step 200. In step 210, received total wideband power for at least a first receiver branch and a second receiver branch are measured at a plurality of times. A probability distribution for a first power quantity and a second power quantity, both being related to selected state variables of an estimation algorithm, are estimated a plurality of times in step 212. The estimation is based on quantities representing the measured received total wideband power of the first receiver branch as well as of the second receiver branch using selected measurement functions of the selected state variables of the estimation algorithm. As already mentioned, the selected state variables correspond to cell power quantities and the selected measurement functions correspond to the quantities representing the measured received total wideband power of the first and second receiver branches. In step 214 a conditional probability distribution of a first noise floor measure is computed based on at least a number of the estimated probability distributions for the first power quantity and a conditional probability distribution of a second noise floor measure is computed based on at least a number of the estimated probability distributions for the second power quantity. In step 216, load reference data is provided based on the computed conditional probability distributions of the first and second noise floor measures. The method ends in step 219.

Figure 6:
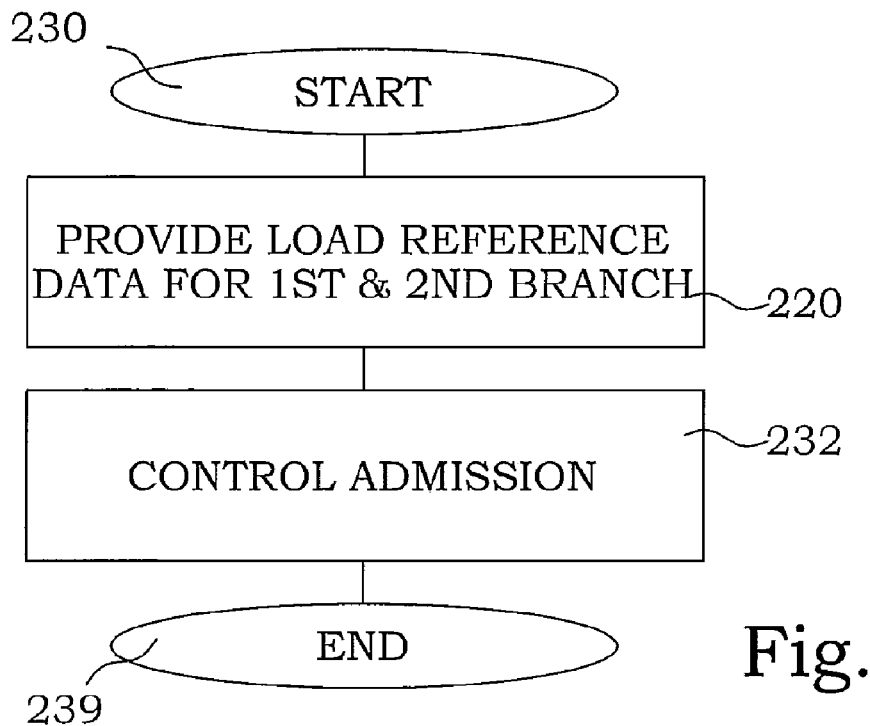
FIG. 6 is a flow diagram of steps of an embodiment of a method for admission control according to the present invention.

The method can be utilized as a base for additional methods within the wireless communication system. In FIG. 6, a flow diagram of steps of an embodiment of a method for admission control according to the present invention is illustrated. The method for admission control in a CDMA wireless communication system with receiver diversity starts in step 230. In step 220, load reference data is provided according to a method for providing load reference data according to the present invention, e.g. as shown in FIG. 5. In step 232, admission is controlled based on the load reference data. The method ends in step 239.

Figure 7:
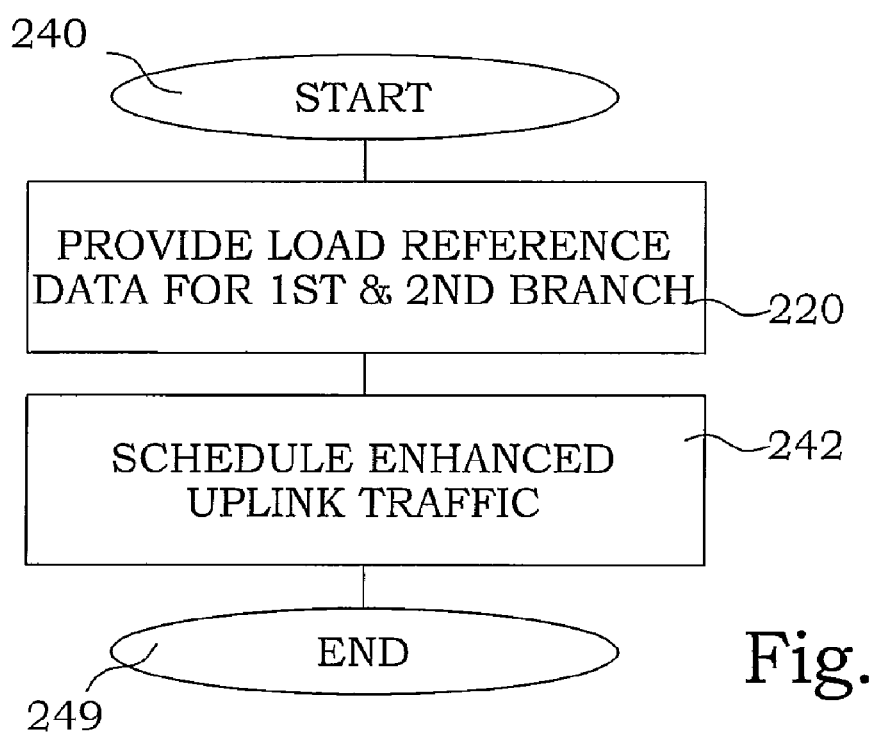
FIG. 7 is a flow diagram of steps of an embodiment of a method for enhanced uplink scheduling according to the present invention.

In FIG. 7, a flow diagram of steps of an embodiment of a method for enhanced uplink scheduling according to the present invention is illustrated. The method for enhanced uplink scheduling in a CDMA wireless communication system with receiver diversity starts in step 240. In step 220, load reference data is provided according to a method for providing load reference data according to the present invention, e.g. as shown in FIG. 5. In step 242, enhanced uplink traffic is scheduled based on the load reference data. The method ends in step 249.

Figure 8:
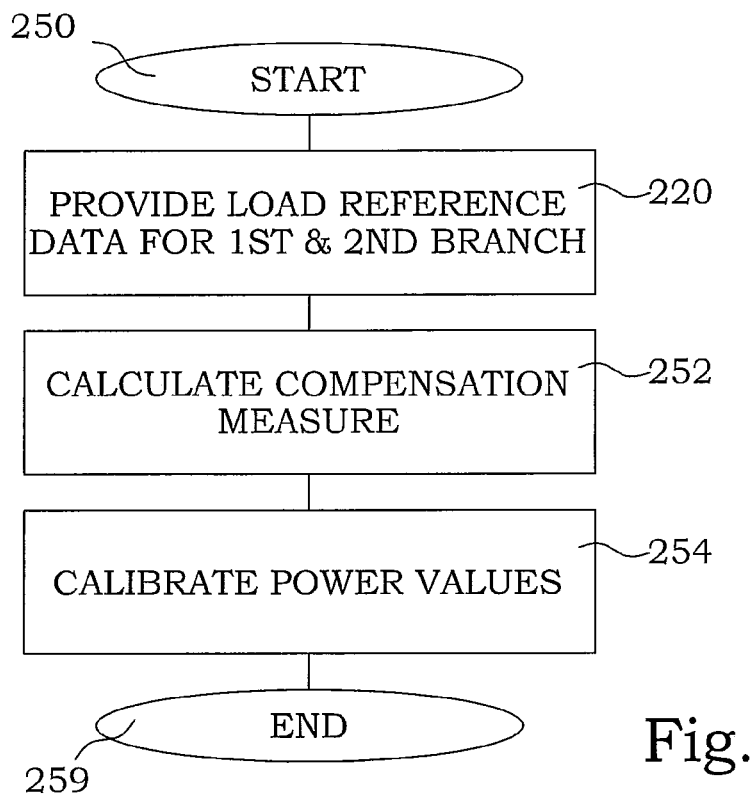
FIG. 8 is a flow diagram of steps of an embodiment of a method for receiver branch calibration according to the present invention.

In FIG. 8, a flow diagram of steps of an embodiment of a method for receiver branch calibration according to the present invention is illustrated. The method for receiver branch calibration in a CDMA wireless communication system with receiver diversity starts in step 250. In step 220, load reference data is provided according to a method for providing load reference data according to the present invention, e.g. as shown in FIG. 5. In step 252, a compensation measure representing a difference in thermal noise power floor between said first and second receiver branch is calculated. In step 254 power values received at least one of the first and second receiver branch are calibrated based on the compensation measure. The method ends in step 259.

Figure 9:
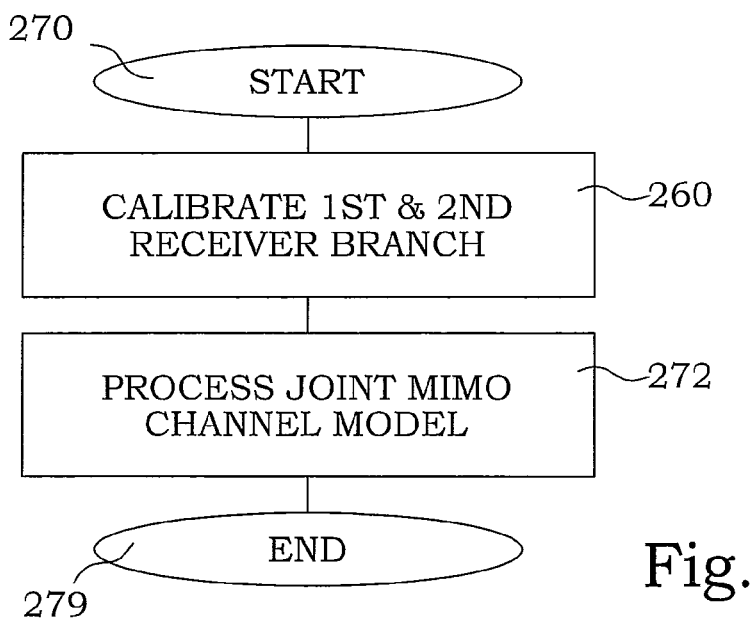
FIG. 9 is a flow diagram of steps of an embodiment of a method for MIMO processing according to the present invention.

In FIG. 9, a flow diagram of steps of an embodiment of a method for multiple-input-multiple-output processing according to the present invention is illustrated. The method for multiple-input-multiple-output processing in a CDMA wireless communication system starts in step 270. In step 260, receiver branch calibration is performed according to a method for receiver branch calibration according to the present invention, e.g. as shown in FIG. 7. In step 272, a joint multiple-input-multiple-output channel model of said first and second receiver branch is processed. The method ends in step 279.

A few examples of presently preferred embodiments for load estimation structures are discussed here below. The soft load estimation algorithms are adapted to a MIMO front end. Corresponding arrangements therefore have to be provided with means for handling multiple-input-multiple-output transmissions.

Figure 10:
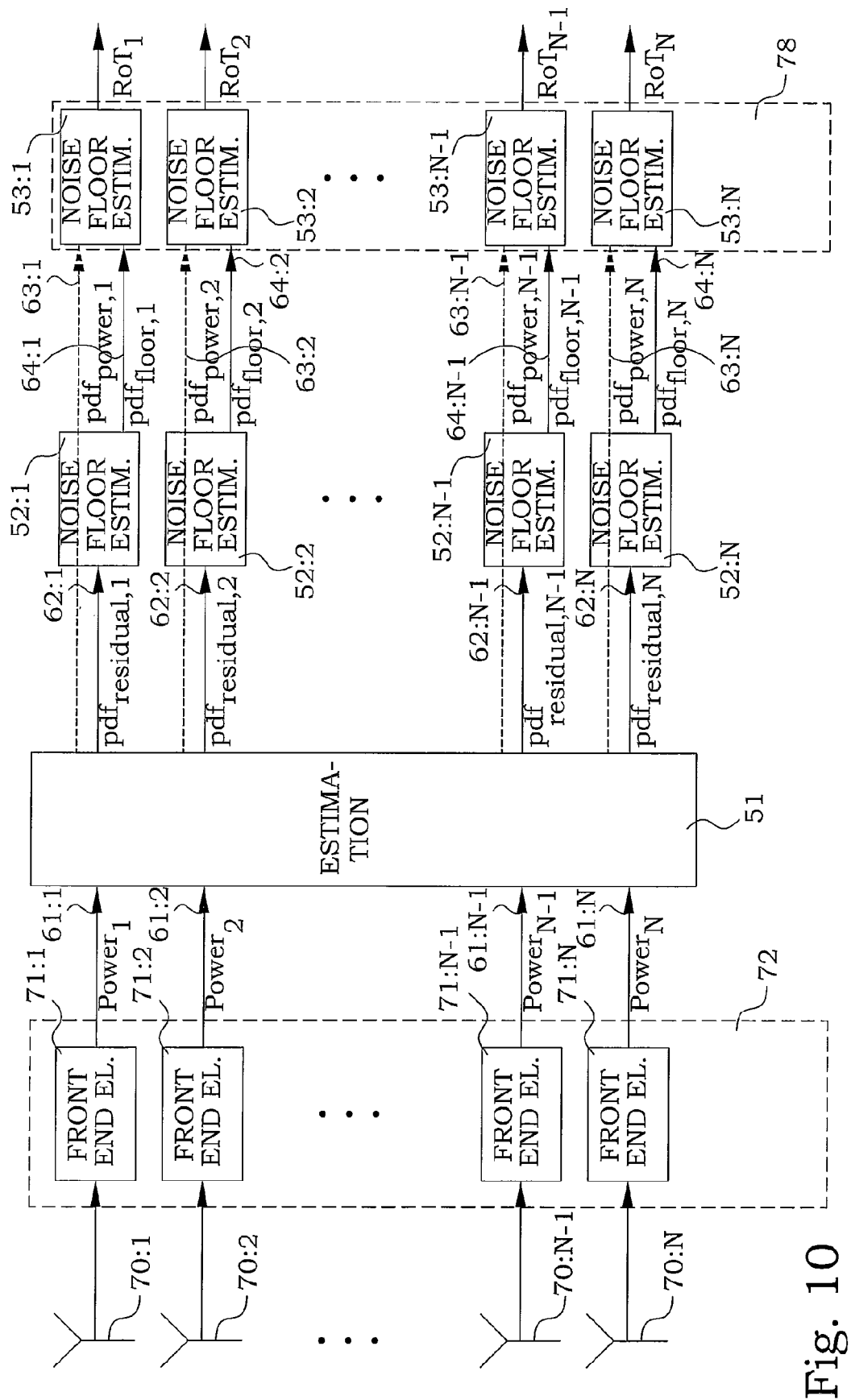
FIG. 10 is a block diagram of an embodiment of an arrangement for MIMO/Rx diversity load estimation according to the present invention.

First, MIMO/Rx diversity load estimation using non-standardised wideband power will be discussed in connection with FIG. 10. A number N of receiver branches 70:1-70:N are available. Each receiver branch 70:1-70:N has its own respective front end electronics 71:1-71:N. In each branch front end electronics 71:1-71:N a wideband power in the associated receiver branch is measured. In other words, the front end electronics 71:1-71:N together constitutes a means 72 for obtaining at least quantities representing measures 61:1-61:N of wideband power for a number of receiver branches at a plurality of times. These measures are denoted $Power_i$, $i=1,\ldots,N$. A common power estimation block 51 receives the measures and provides estimated, approximately Gaussian probability density functions (PDF) 62:1-62:N of estimated residual powers, $pdf_{residual,i}$, $i=1,\ldots,N$ of each receiver branch, possibly smoothed by a Kalman smoother. In other words, the power estimation block 51 constitutes a means for estimating, a plurality of times, a probability distribution for a number of power quantities. As mentioned further above, the power estimation block 51 is arranged to operate with selected state variables of an estimation algorithm corresponding to cell power quantities, and with selected measurement functions corresponding to quantities representing the measured received total wideband power of the different receiver branches. The power quantities are related to the selected state variables. This means that the power estimation block 51 is arranged for estimating the probability distributions for the power quantities using the selected measurement functions. The common power estimation block 51 also provides estimated, approximately Gaussian pdf's 63:1-63:N of the estimated wideband power of each receiver branch, $pdf_{Power,i}$, $i=1,\ldots,N$.

The residual power pdf's 62:1-62:N, i.e. $pdf_{residual,i}$, $i=1,\ldots,N$, are input into separate conditional probability distribution estimation blocks 52:1-52:N, where an estimated pdf 64:1-64:N of the thermal noise power floor of a respective receiver branch, $pdf_{floor,i}$, $i=1,\ldots,N$ is computed. Together the conditional probability distribution estimation blocks 52:1-52:N constitute a means 77 for computing a conditional probability distribution of noise floor measures for all the different branches. The estimated pdf 64:1-64:N of the thermal noise power floor of a respective receiver branch, $pdf_{floor,i}$, $i=1,\ldots,N$ from the separate conditional probability distribution estimation blocks 52:1-52:N and the pdf's 63:1-63:N of the estimated wideband power of each receiver branch, $pdf_{Power,i}$, $i=1,\ldots,N$ from the common power estimation block 51 are input into separate noise rise estimation blocks 53:1-53:N, one for each receiver branch. The noise rise estimation blocks 53:1-53:N provide estimated rise over thermal, of a respective receiver branch. The noise rise estimation blocks 53:1-53:N is one example of a means 78 for providing load reference data based on the computed conditional probability distributions of the different noise floor measures.

Figure 11:
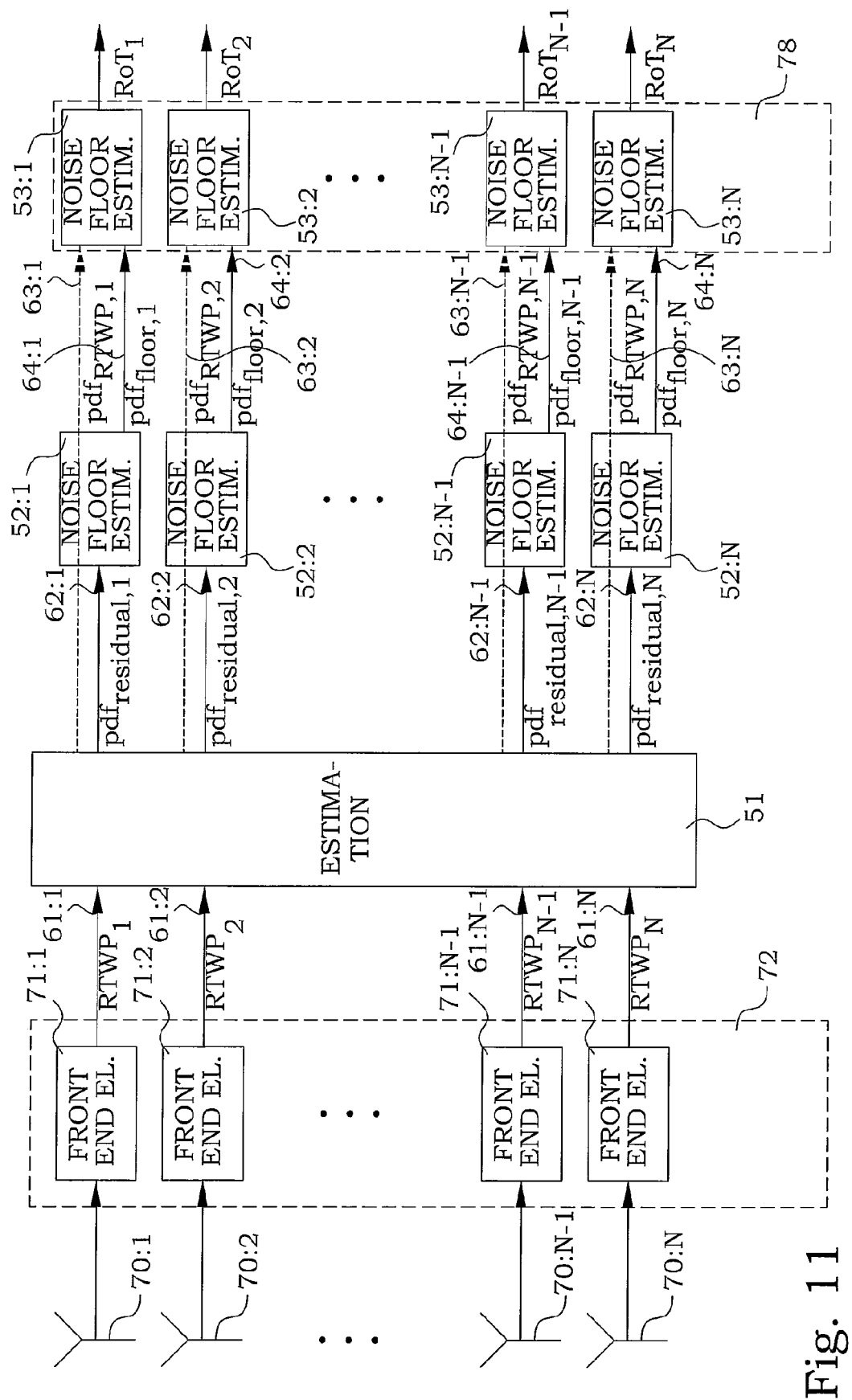
FIG. 11 is a block diagram of another embodiment of an arrangement for MIMO/Rx diversity load estimation according to the present invention.

A MIMO/Rx diversity load estimation using only received total wideband power will be discussed in connection with FIG. 11. The configuration is very similar to the embodiment of FIG. 10, and only differences will be discussed. In the embodiment of FIG. 11, the branch front end electronics 71:1-71:N measure a respective 3GPP standardized measured total received wideband power $RTWP_i$, $i=1,\ldots,N$ and provide it as measures 61:1-61:N to the common power estimation block 51. The common power estimation block 51 provides in this embodiment estimated, approximately Gaussian pdf's 63:1-63:N of the estimated total received wideband power of each receiver branch, $pdf_{RTWP,i}$, $i=1,\ldots,N$. Finally, the noise rise estimation blocks 53:1-53:N base their estimated rise over thermal 65:1-65:N, $RoT_i$, $i=1,\ldots,N$ on the estimated total received wideband power $pdf_{RTWP,i}$, $i=1,\ldots,N$.

Figure 12:
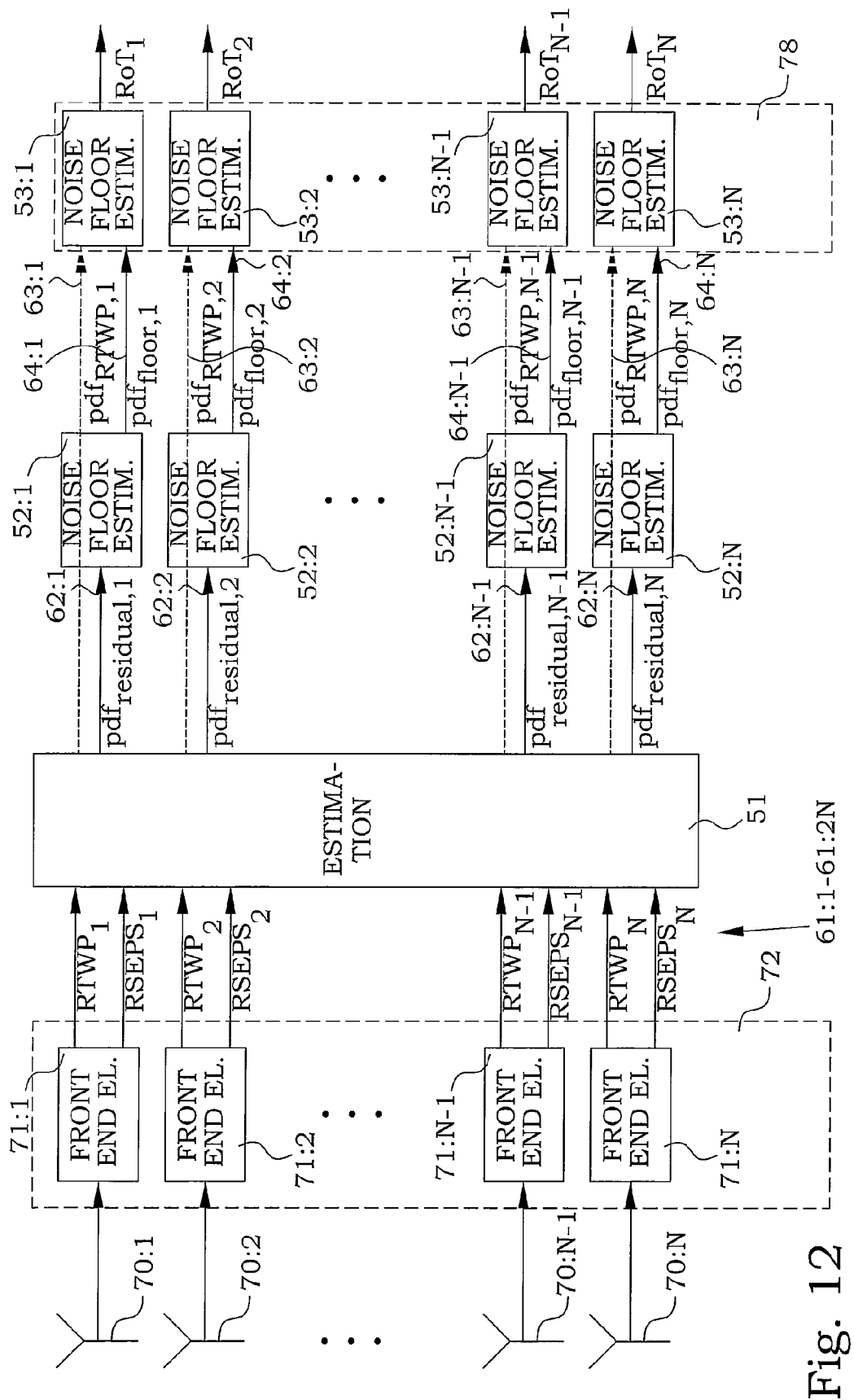
FIG. 12 is a block diagram of yet another embodiment of an arrangement for MIMO/Rx diversity load estimation according to the present invention.

A MIMO/Rx diversity load estimation using received total wideband power as well as received scheduled enhanced uplink power will be discussed in connection with FIG. 12. The configuration has large similarities to the embodiment of FIG. 11, and only differences will be discussed. In the embodiment of FIG. 12, the branch front end electronics 71:1-71:N measure a respective 3GPP standardized measured total received wideband power $RTWP_i$, i=1, ..., N and a respective 3GPP standardized measured received scheduled enhanced uplink power, $RSEPS_i$, i=1, ..., N and provide it as measures 61:1-61:2N to the common power estimation block 51. In this case the front end electronics is defined to also include the digital RAKE receiver necessary to measure RSEPS. The residual power estimates provided by the common power estimation block 51 can thereby be improved by utilizing a difference between the RTWP and the RSEPS, as described in the appendices.

Figure 13:
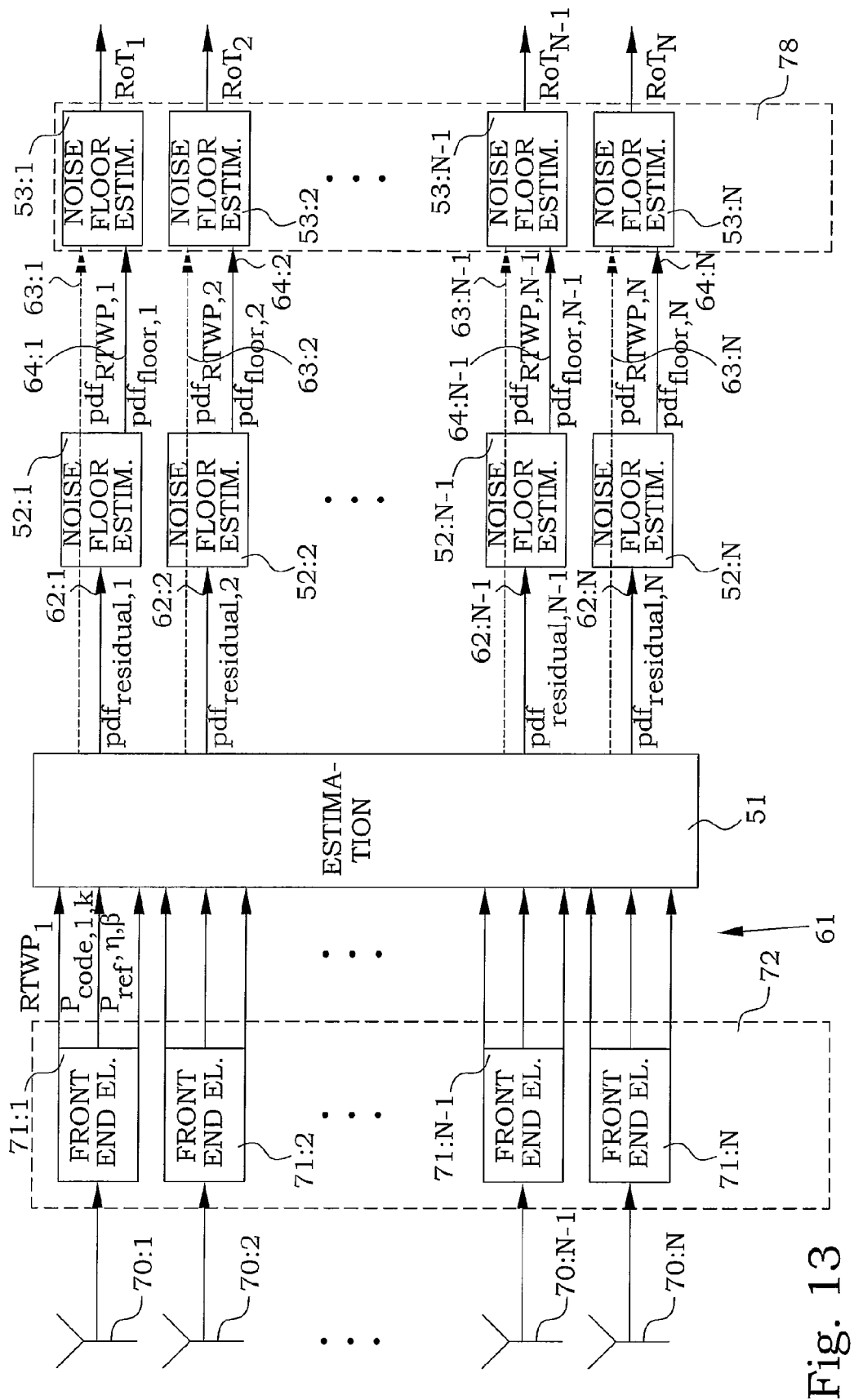
FIG. 13 is a block diagram of another further embodiment of an arrangement for MIMO/Rx diversity load estimation according to the present invention.

A MIMO/Rx diversity load estimation using received total wideband power, code powers, beta factors, number of code as well as code power references, for each receiver branch will be discussed in connection with FIG. 13. The configuration has large similarities to the embodiment of FIG. 11, and only differences will be discussed. In the embodiment of FIG. 13, the branch front end electronics 71:1-71:N measure a respective 3GPP standardized measured total received wideband power $RTWP_i$, i=1, ..., N and respective received uplink power of a power controlled channel $P_{code,i,k}$, k=1, ..., $M_i$, i=1, ..., N for $M_i$ channels, decoded beta factors $\beta_{i,k}$, k=1, ..., $M_i$, i=1, ..., N of each power controlled channel, the number of codes $n_{i,k}$ k=1, ..., $M_i$, i=1, ..., N of a power controlled channel as well as commended power $P_{ref,i,k}$, k=1, ..., $M_i$, i=1, ..., N of a power controlled channel. The measurements are denoted only for one branch in order to facilitate the reading of the figure. The measures, collectively denoted by 61, are provided to the common power estimation block 51. In this case, the power measurements have to be performed after decoding, in order to obtain requested quantities. The residual power estimates provided by the common power estimation block 51 can thereby be improved by utilizing the additional measurements in analogy with the ideas of WO 2007/024166 for single receiver branches. In particular, the estimated power quantities are measures of a difference between received total wideband power and a sum of received channel code powers for the different receiver branches.

Figure 14:
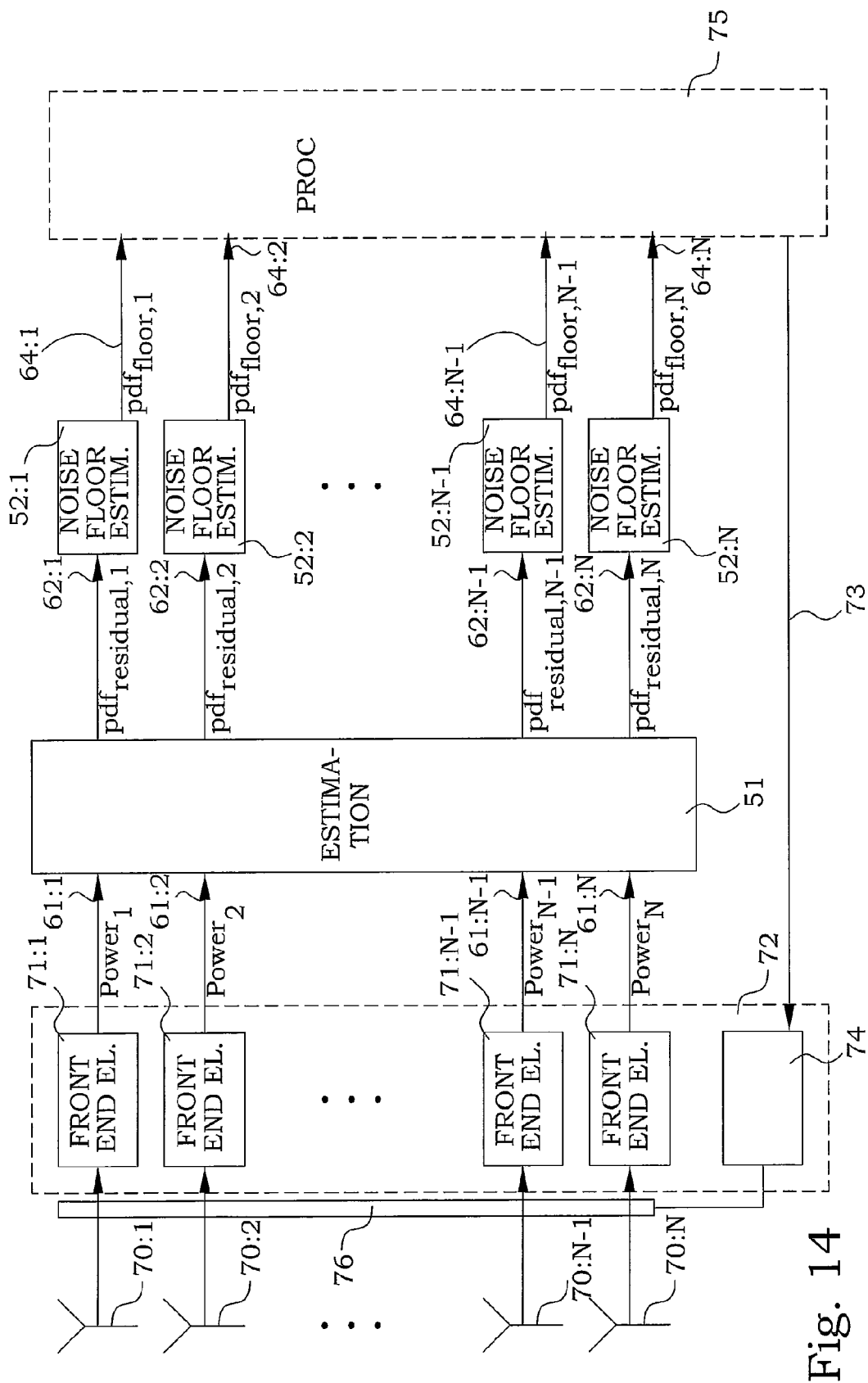
FIG. 14 is a block diagram of an embodiment of a load estimation arrangement used for MIMO/Rx diversity front end calibration according to the present invention.

In the case of utilizing load reference data for e.g. calibration purposes, the actual calculation of the noise rise measure is not necessary. A MIMO/Rx diversity front end calibration using measurements of wideband power will be discussed in connection with FIG. 14. A number N of receiver branches 70:1-70:N are available. Each receiver branch 70:1-70:N has its own respective front end electronics 71:1-71:N. In each branch front end electronics 71:1-71:N a wideband power in the associated receiver branch is measured. In other words, the front end electronics 71:1-71:N together constitutes a means 72 for obtaining at least quantities representing measures 61:1-61:N of wideband power for a number of receiver branches at a plurality of times. These measures are denoted $Power_i$, i=1, ..., N. A common power estimation block 51 receives the measures and provides estimated, approximately Gaussian probability density functions (pdf) 62:1-62:N of estimated residual power, $pdf_{residual,i}$, i=1, ..., N of each receiver branch, possibly smoothed by a Kalman smoother. The residual power pdf's 62:1-62:N, i.e. $pdf_{residual,i}$, i=1, ..., N, are input into separate conditional probability distribution estimation blocks 52:1-52:N, where an estimated value 164:1-164:N of the thermal noise power floor of a respective receiver branch, $x_{floor,i}$, i=1, ..., N is computed. The estimated value 164:1-164:N of the thermal noise power floor of a respective receiver branch, $x_{floor,i}$, i=1, ..., N from the separate conditional probability distribution estimation blocks 52:1-52:N are input into a common means for calculating a compensation measure 73. The conditional probability distribution estimation blocks 52:1-52:N comprises in this embodiment the means for providing load reference data, since a value of the thermal noise power floor is derived from the conditional probability distributions of the noise floor measures. The compensation measure represents differences in thermal noise power floor between different receiver branches. The compensation measure comprising these difference values can be used for calibrating the power values received by the different receiver branches, e.g. by including a means 74 for calibrating power values in the means 72 for obtaining wideband power measures. In this embodiment, the measured wideband power is not necessarily equal to the standardized RTWP, which means that the configuration can operate without having to decode the signal in advance. This can be important for MIMO applications since important parts of the MIMO processing may be performed before decoding of the signals. A processor 75 arranged for processing a joint multiple-input-multiple-output channel model of the receiver branches is then advantageously connected to the means for calculating a compensation measure 73, as shown by the broken lines in FIG. 14. A means 76 for handling multiple-input-multiple-output transmissions at the receiver branches is then also preferably provided.

Figure 15:
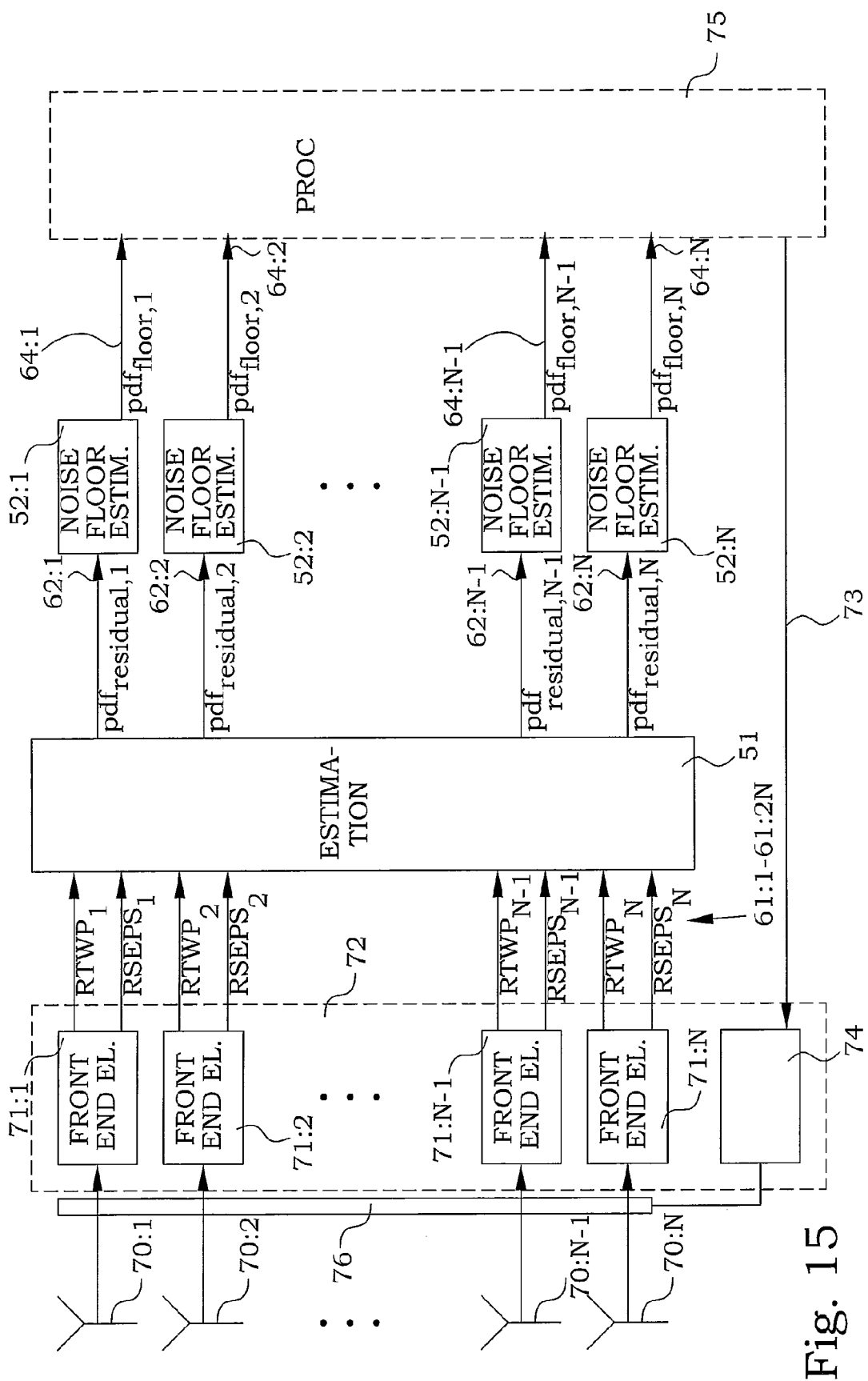
FIG. 15 is a block diagram of another embodiment of a load estimation arrangement used for MIMO/Rx diversity front end calibration according to the present invention.

A MIMO/Rx diversity front end calibration using received total wideband power as well as received scheduled enhanced uplink power will be discussed in connection with FIG. 15. The configuration has large similarities to the embodiment of FIG. 14, and only differences will be discussed. In the embodiment of FIG. 15, the branch front end electronics 71:1-71:N measure a respective 3GPP standardized measured total received wideband power $RTWP_i$, i=1, ..., N and a respective 3GPP standardized measured received scheduled enhanced uplink power, $RSEPS_i$, i=1, ..., N and provide it as measures 61:1-61:2N to the common power estimation block 51. The residual power estimates provided by the common power estimation block 51 can thereby be improved by utilizing a difference between the RTWP and the RSEPS, as described in the appendices. However, in this embodiment, decoding of the signals is necessary for each receiver branch before calibration.

Figure 16:
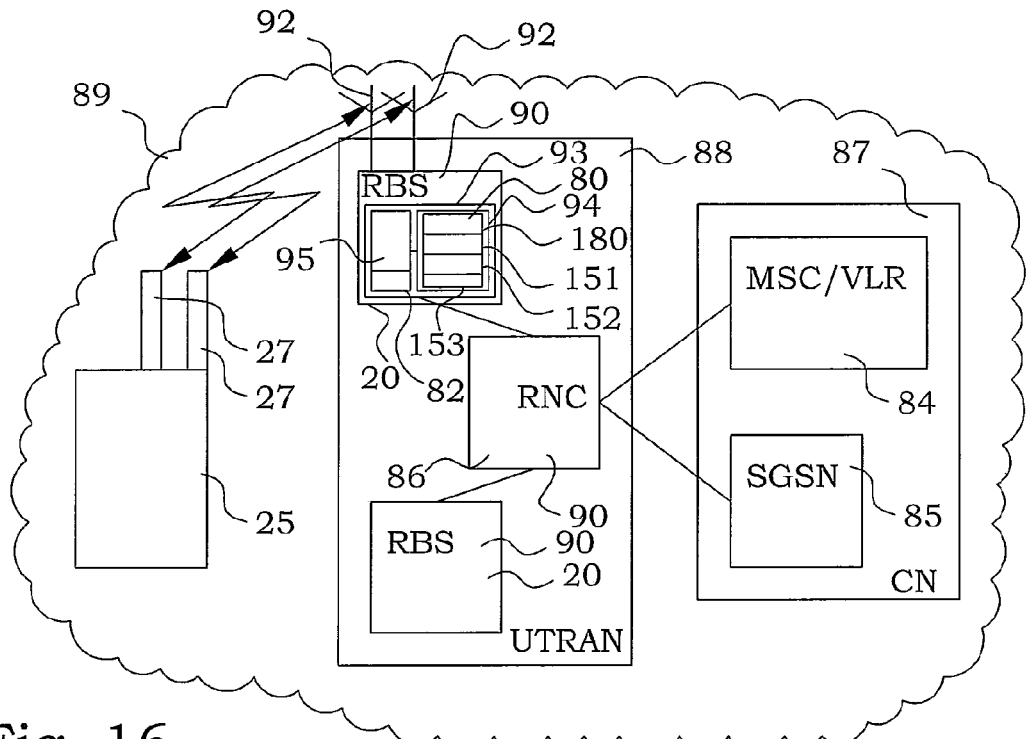
FIG. 16 is a block diagram of an embodiment of a CDMA wireless communications system 89 with receiver diversity according to the present invention.

FIG. 16 illustrates a CDMA wireless communications system 89 with receiver diversity comprising at least one node 90 benefiting from accurate load estimations. In the description above, it is assumed that the power estimations concern uplink communication. The power measurements are in such cases performed by a node 90 in a Universal mobile telecommunication system Terrestrial Radio Access Network (UTRAN) 88, typically a radio base station 20. A mobile terminal 25, having at least two antennas 27, is in radio contact with a RBS 20 in the UTRAN 88, via at least two receiver branches 92.

In the present embodiment, the RBS 20 comprises an enhanced uplink scheduling arrangement 93. The enhanced uplink scheduling arrangement 93 comprises an arrangement for providing load reference data 94 and an enhanced uplink scheduling unit 95 connected to the arrangement for providing load reference data 94. The arrangement for providing load reference data 94 comprises means 80 for obtaining quantities representing measures of received total wideband power for the two receiver branches 92. Since the actual measurements are performed in the RBS as well, the means 80 for obtaining quantities representing measures of received total wideband power for the two receiver branches 92 comprises in this embodiment measuring means 180 of received total wideband power for the two receiver branches 92. The arrangement for providing load reference data 94 further comprises means 151 for estimating a probability distribution for a first and second power quantity associated with a respective receiver branch 92.

Means 151 for estimating a probability distribution is connected to the means 80 for obtaining quantities representing measures of received total wideband power. The estimation is made from at least quantities representing the measured received total wideband power of both receiver branches.

In the present embodiment, the arrangement for providing load reference data 94 further comprises means 152 for computing a conditional probability distribution of a noise floor measure for a respective receiver branch. The means 152 for computing a conditional probability distribution of a noise floor measure is connected to the means 151 for estimating. In the present embodiment, the arrangement for providing load reference data 94 also comprises means 153 for providing load reference data for a respective receiver branch, connected to the means 151 for estimating and the means 152 for computing. The enhanced uplink scheduling unit 95 utilizes the load reference data for scheduling enhanced uplink traffic.

In the embodiment of FIG. 16 the RBS 20 also comprises a transmitter 82 for transmitting the load reference data within the CDMA wireless communication system 89. The wireless communications system 89 comprises in this embodiment a UTRAN 88 and a core network CN 87. The RBS 20 is controlled by a RNC 86, which in turn is connected to a Mobile services Switching Centre/Visitor Location Register (MSC/VLR) 84 and a Serving General packet radio system Support Node (SGSN) 85 of the core network CN 87.

Figure 17:
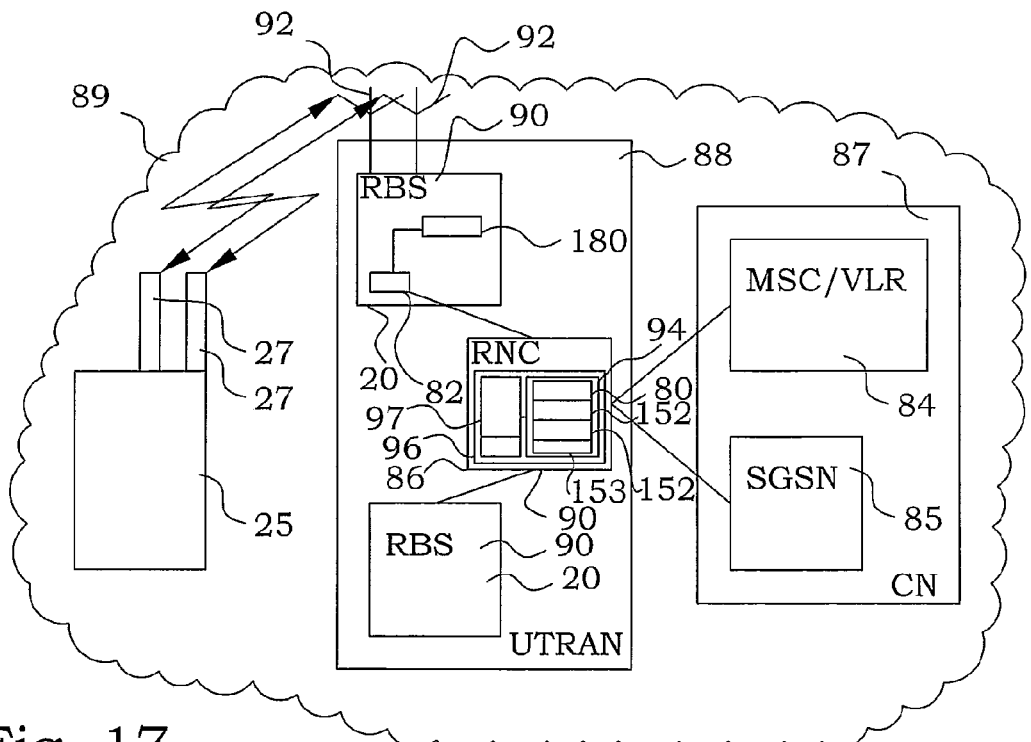
FIG. 17 is a block diagram of another embodiment of a CDMA wireless communications system 89 with receiver diversity according to the present invention.

FIG. 17 illustrates another CDMA wireless communications system 89 with receiver diversity. In this embodiment, the RNC 86 comprises an admission control arrangement 96. The admission control arrangement 96 in turn comprises an arrangement 94 for providing load reference data and an admission control unit 97 connected to the arrangement 94 for providing load reference data. In this embodiment, the means 80 for obtaining quantities representing measures of received total wideband power for the two receiver branches 92 comprises a receiver for receiving measurement data from the RBS's 20. The RBS's 20 comprise in this embodiment the actual measuring means 180 of received total wideband power for the two receiver branches 92.

In alternative embodiments, the arrangement 94 for providing load reference data can be a distributed arrangement e.g. comprising parts of both RBS's 20 and RNC's 86.

The most complicated setup comprises estimates of time variable powers of each power controlled channel of the cell, in order to allow a removal of own cell power before the noise floor power is estimated. The intention is that this reduction of interference, as seen by the thermal noise floor estimation, should improve the accuracy of the overall estimator. In such a case, e.g. for enabling additional information e.g. on beta factors, each channel has to treated separately. Since the computational complexity of a general Kalman filter varies as the number of states raised to the third power, the consequence of the above is typically an unacceptably high computational complexity. The computational complexity can, however, be reduced by the introduction of an approximate block structure in several steps in the Kalman filter algorithm. The end achievement is a reduction of the computational complexity to the number of states raised to the second power. This represents a substantial saving, a factor of 25 in a typical situation. Such approach is as applied to a single receiver branch described in WO2007/055626.

During the computation of the conditional probability distribution of a noise floor measure for a respective receiver branch recursive formulation may be utilized in order to reduce necessary memory consumption. Such approaches can reduce the required memory consumption of the noise floor estimation block to less than 1 percent of previous requirements. A consequence is that one algorithm per cell can be run, e.g. in the RNC.

A typical configuration of an arrangement for admission control comprises means distributed typically between a RBS and a RNC. The RBS can be equipped to provide load reference data. As one example, the RBS can be equipped to measure the RTWP and optionally also the RSEPS and to calculate a noise floor measure or conditional probability distribution of such noise floor measure. The RBS then signals the noise floor measure and preferably also an RTWP measurement and RSEPS measurement to the RNC. The RNC then has the information necessary to perform admission control.

The present invention provides many advantages, some of which will be presented below. A new measurement processing structure, for use in a load estimation step for more than one receiver branch is achieved. The structure includes at least a received total wideband power measurement, for each receiver branch. Optionally, the structure also includes the so called RSEPS measurement, for each receiver branch. The structure exploits a correlation between receiver branches, preferably by means of using the systems noise covariance matrix of the Kalman filter. One residual power quantity and a corresponding variance, is estimated for each receiver branch, to be used for further load estimation steps for the respective receiver branch. Optionally, a total wideband power quantity and a corresponding variance, is estimated for each receiver branch, to be used for further load estimation steps for the respective receiver branch, in particular when a of a noise floor value is requested.

Furthermore, an on-line, low complexity algorithm for joint estimation of the thermal noise power floor of each uplink receiver branch, of a MIMO or Rx diversity receiver of a WCDMA (or CDMA) cellular system is achieved. The algorithm exploits input measurements, being discretized analogue total wideband power measurements, at any point of the receiver chain. The point is the same for all receiver branches. One residual power quantity and a corresponding variance, is estimated for each receiver branch, to be used for further noise floor estimation steps, for the respective receiver branch. The thermal noise power floor estimates can advantageously be used for receiver branch calibration purposes. The calibration algorithm calculates compensation values. The compensation values are applied to the incoming signal of each receiver branch, thereby resulting in digitized receiver power streams of each branch with approximately the same thermal noise floor, i.e. achieving a calibrated MIMO/Rx diversity radio receiver.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

If both RTWP and RSEPS measurements are available, in order to provide an estimate of the residual power in the digital receiver, i.e. the received total wideband power minus the received scheduled enhanced uplink power (shared)), and to compute a noise rise measure, a two state model needs to be introduced. The selection of states is, as usual, arbitrary.

However, one natural choice is to use one state that describes the RSEPS and one state that describes "the rest" of the power, here denoted the residual power. Further choices are discussed below. In case the objective is limited to the estimation of a noise floor measure, it is possible to use a one state model. This possibility is also outlined below.

Noting that these states describe powers and are therefore necessarily positive, they need to include a nonzero mean value. Such mean values are modeled as random walk components. It is assumed that any power measurements defined logarithmically using e.g., the dBm scale has been transformed to the linear power domain before processing. For the selection of states of the present example, this leads to the state definitions:

$$x_{RSEPSPower,i}(t+T) = \begin{pmatrix} x_{RSEPSPower,i}(t+T) \\ x_{RSEPSPowerDynamics,i}(t+T) \end{pmatrix} \quad (A1)$$

$$= \begin{pmatrix} 1 & A^1_{RSEPSPower,i}(t) \\ 0 & A^2_{RSEPSPower,i}(t) \end{pmatrix} \begin{pmatrix} x_{RSEPSPower,i}(t) \\ x_{RSEPSPowerDynamics,i}(t) \end{pmatrix} +$$

$$\begin{pmatrix} w_{RSEPSPower,i}(t) \\ w_{RSEPSPowerDynamics,i}(t) \end{pmatrix}$$

$$= \begin{pmatrix} 1 & A^1_{RSEPSPower,i}(t) \\ 0 & A^2_{RSEPSPower,i}(t) \end{pmatrix} x_{RSEPSPower,i}(t) + w_{RSEPSPower,i}(t),$$

$$i = 1, \ldots, N_{Branches}.$$

$$x_{Residual,i}(t+T) = \begin{pmatrix} x_{Residual,i}(t+T) \\ x_{ResidualDynamics,i}(t+T) \end{pmatrix} \quad (A2)$$

$$= \begin{pmatrix} 1 & A^1_{Residual,i}(t) \\ 0 & A^2_{Residual,i}(t) \end{pmatrix} \begin{pmatrix} x_{Residual,i}(t) \\ x_{ResidualDynamics,i}(t) \end{pmatrix} +$$

$$\begin{pmatrix} w_{Residual,i}(t) \\ w_{ResidualDynamics,i}(t) \end{pmatrix}$$

$$= \begin{pmatrix} 1 & A^1_{Residual,i}(t) \\ 0 & A^2_{Residual,i}(t) \end{pmatrix} x_{Residual,i}(t) + w_{Residual,i}(t),$$

$$i = 1, \ldots, N_{Branches}.$$

-continued $$x(t) = \begin{pmatrix} x_{RSEPSPower,1}(t) \\ x_{Residual,1}(t) \\ \vdots \\ x_{RSEPSPower,N_{Branch}}(t) \\ x_{Residual,N_{Branch}}(t) \end{pmatrix} \quad (A3)$$

$$w(t) = \begin{pmatrix} w_{RSEPSPower,1}(t) \\ w_{Residual,1}(t) \\ \vdots \\ w_{RSEPSPower,N_{Branch}}(t) \\ w_{Residual,N_{Branch}}(t) \end{pmatrix}. \quad (A4)$$

Here (A3) refers to (3). $x_{RSEPSPower,i}(t)$ denotes the state corresponding to the received scheduled enhanced uplink power of receiver branch i, that is measured as the logarithmic fractional RSEPS quantity, $x_{RSEPSPowerDyamics,i}(t)$ denotes the power state variables that are used for modeling of the dynamics of the power that is expressed by the RSEPS quantity, for receiver branch i. This dynamics is described by the matrices $A_{RSEPSPower,i}^1(t)$ and $A_{RSEPSPower,i}^2(t)$, where the time variation is introduced mainly to allow for the introduction of time variable adaptive spectral analysis processing, as described below. The quantity $w_{RSEPSPower,i}(t)$ is the process noise (i.e. the stochastic modeling error) of the power of receiver branch i, corresponding to the fractional RSEPS quantity. The notation is the same for the quantities that describe the residual power.

At this point is stressed that the quantity that is to be fed into the subsequent noise power floor estimation steps (one for each receiver branch) is given by the estimated $x_{residual,i}(t)$, $i=1, \ldots, N_{Branches}$, and the corresponding estimated variance (see below). The final result of this subsection is the state model $$x(t+T) = A(t)x(t) + w(t), \quad (A5)$$

where the system matrix $A(t)$ is given by $$A(t) = \begin{pmatrix} 1 & A^1_{RSEPSPower,1}(t) & 0 & & \cdots & & \cdots & & 0 \\ 0 & A^2_{RSEPSPower,1}(t) & 0 & & \cdots & & & & \vdots \\ 0 & 0 & 1 & A^1_{Residual,1}(t) & 0 & & & & \\ \vdots & & 0 & A^2_{Residual,1}(t) & 0 & & & & \\ & & & 0 & \ddots & & & & \\ & & & & \ddots & 1 & A^1_{RSEPSPower,N_{Branch}}(t) & 0 & \vdots \\ & & & & 0 & A^2_{RSEPSPower,N_{Branch}}(t) & 0 & 0 \\ \vdots & & & & & 0 & 1 & A^1_{RSEPSPower,N_{Branch}}(t) \\ 0 & \cdots & & & \cdots & 0 & 0 & A^2_{RSEPSPower,N_{Branch}}(t) \end{pmatrix}. \quad (A6)$$

Note that (A6) is a special case of the first equation of (3), since a(x(t))=A(t)x(t).

It remains to define the statistical properties of the process noise. These quantities are modeled as white Gaussian zero mean random processes. As compared to prior art, correlation is introduced between powers of one receiver branch, as well as between powers of different receiver branches using the system noise covariance matrix. This is a situation that can be expected when Rx diversity and some variants of MIMO receiving systems are designed.

As an example of a typical embodiment, each receiver branch is assumed to fulfill:

$$E[w_{RSEPSPower,i}(t)w^T_{RSEPSPower,i}(t)] = \begin{pmatrix} R_{1,RSEPSPower,i} & 0 \\ 0 & R_{1,RSEPSPowerDynamics,i} \end{pmatrix}, \quad (A7)$$

$$i = 1, \ldots, N_{Branches},$$

$$E[w_{Residual,i}(t)w^T_{Residual,i}(t)] = \begin{pmatrix} R_{1,Residual,i} & 0 \\ 0 & R_{1,ResidualDynamics,i} \end{pmatrix}, \quad (A8)$$

$$i = 1, \ldots, N_{Branches},$$

$$E[w_{RSEPSPower,i}(t)w^T_{Residual,i}(t)] = \begin{pmatrix} R_{1,RSEPSResidual,i} & 0 \\ 0 & 0 \end{pmatrix}, \quad (A9)$$

$$i = 1, \ldots, N_{Branches}.$$

Here E[.] denotes statistical expectation. Note that the special case without power dynamics is readily obtained by deletion of the corresponding states and matrix blocks.

To summarize, the following describes the systems noise covariance, for receiver branch i $$R_{1,i} = \begin{pmatrix} R_{1,RSEPSPower,i} & 0 & R_{1,RSEPSResidual,i} & 0 \\ 0 & R_{1,RSEPSPowerDynamics,i} & 0 & 0 \\ R_{1,RSEPSResidual,i} & 0 & R_{1,Residual,i} & 0 \\ 0 & 0 & 0 & R_{1,ResidualDynamics,i} \end{pmatrix}. \quad (A10)$$

In the above embodiment correlation is introduced between the states corresponding to the residual power and the RSEPS power, whereas the correlation between power and dynamics is left unaffected, as is the correlation between the dynamics of the residual power and the RSEPS power. More general setups are of course possible, where all correlation elements are left in the matrices. The problem is then the determination of a large number of unknown correlation parameters. In view of this, the above assumption seems reasonable, since it captures at least the correlation between powers within a matrix block.

It remains to model the correlations, between the powers of different receiver branches. Correlation properties between receiver branches, e.g. regarding spatial and polarization correlation effects have to be included. The estimation algorithm comprises preferably a joint system noise covariance modeling correlation between the different receiver branches. The joint system noise covariance comprises more preferably at least one of spatial diversity covariance and polarization diversity covariance. Considering a typical embodiment with an antenna array with receiver branches uniformly distributed, with corresponding receiver signal chains, it is reasonable to assume that the correlations between an arbitrary stationary received power signal.

$$x^{received}(t) = \begin{pmatrix} x_1(t) \\ x_2(t) \\ \vdots \\ x_{N_{Branch}-1}(t) \\ x_{N_{Branch}}(t) \end{pmatrix} \quad (A11)$$

in the antenna array with multiple Rx diversity receiving branches is given by $$\rho^{received} = (D^{received})^{-1} E\begin{bmatrix} (x^{received}(t) - x^{received}_{true}(t)) \\ (x^{received}(t) - x^{received}_{True}(t))^T \end{bmatrix} \quad (A12)$$

$$(D^{received})^{-1}$$

$$= \begin{pmatrix} 1 & \rho & \cdots & \rho^{|N_{Branch}-2|} & \rho^{|N_{Branch}-1|} \\ \rho & 1 & \ddots & & \rho^{|N_{Branch}-2|} \\ \vdots & \ddots & \ddots & \ddots & \vdots \\ \rho^{|2-N_{Branch}|} & & \ddots & 1 & \rho \\ \rho^{|1-N_{Branch}|} & \rho^{|2-N_{Branch}|} & & \rho & 1 \end{pmatrix}.$$

Here $\rho$ denotes the correlation between systems power noise between adjacent receiver branches. $x_{True}^{Received}(t)$ denotes the "true" (conditional mean) received signal. The standard deviation matrix $D^{received}$ is given by $$D^{received} = \quad (A13)$$

$$\begin{pmatrix} \sqrt{E\left[\frac{x_1^{received}(t) - }{x_{1,true}^{received}(t)}\right]^2} & 0 & \cdots & \cdots & 0 \\ 0 & \ddots & & & \vdots \\ \vdots & & \ddots & & \vdots \\ \vdots & & & \ddots & 0 \\ 0 & \cdots & \cdots & 0 & \sqrt{E\left[\frac{x_{N_{Branch}}^{received}(t) - }{x_{N_{Branch},true}^{received}(t)}\right]^2} \end{pmatrix}$$

It should be noted that more general assumptions are possible. However, the model (A12) is commonly employed in the state of the art, when spatial diversity is discussed.

When polarization diversity is at hand, different models apply. It may then be assumed that the correlation between adjacent antenna elements with different orthogonal polarization is small, whereas the correlation follows (A12) for antenna elements with the same polarization. Non-orthogonal polarization may of course be applied in case the number of antenna elements exceeds 2. As an example, assuming orthogonal polarization diversity with a remaining polarization error correlation of η of every second antenna element, gives $$R^{received} = E\left[\begin{array}{c}(x^{received}(t) - x_{true}^{received}(t))\\(x^{received}(t) - x_{True}^{received}(t))^T\end{array}\right] \qquad (A14)$$

$$= D^{received}\begin{pmatrix} 1 & \eta\rho & \cdots & \rho^{|N_{Branch}-2|} & \eta\rho^{|N_{Branch}-1|} \\ \eta\rho & 1 & \ddots & & \rho^{|N_{Branch}-2|} \\ \vdots & \ddots & \ddots & \ddots & \vdots \\ \rho^{|2-N_{Branch}|} & & \ddots & 1 & \eta\rho \\ \eta\rho^{|1-N_{Branch}|} & \rho^{2-|N_{Branch}|} & & \eta\rho & 1 \end{pmatrix} D^{received},$$

provided that $N_{Branch}$ is even. A similar expression holds in the odd case.

The combination of the correlation between receiver branches and the systems noise covariance matrix of a single receiver branch is the case. When combining, it is clear that each of the elements of (A12), (A14) (and other variants of the correlation matrix) affects all the corresponding states of the receiver branch. This means that the following block matrix formulation can be obtained from (A4), (A7)-(A10) and e.g. (A14)

$$R_1(t) = E[(w(t)w^T(t))] \qquad (A15)$$

$$= E\left[\begin{pmatrix} w_1(t) \\ \vdots \\ w_{N_{Branch}}(t) \end{pmatrix}\left(w_1^T(t) \cdots w_{N_{Branch}}^T(t)\right)\right]$$

$$= \begin{pmatrix} R_{1,1}^{\frac{1}{2}} & 0 & \cdots & & 0 \\ 0 & R_{1,1}^{\frac{1}{2}} & & & \vdots \\ \vdots & & \ddots & & \vdots \\ \vdots & & & R_{1,N_{Branch}-1}^{\frac{1}{2}} & 0 \\ 0 & \cdots & & 0 & R_{1,N_{Branch}}^{\frac{1}{2}} \end{pmatrix}$$

$$\begin{pmatrix} I & I\eta\rho & \cdots & I\rho^{|N_{Branch}-2|} & I\eta\rho^{|N_{Branch}-1|} \\ I\eta\rho & I & \ddots & & I\rho^{|N_{Branch}-2|} \\ \vdots & \ddots & \ddots & \ddots & \vdots \\ \rho^{|2-N_{Branch}|} & & \ddots & I & I\eta\rho \\ I\eta\rho^{|1-N_{Branch}|} & I\rho^{2-|N_{Branch}|} & & I\eta\rho & I \end{pmatrix}$$

$$\begin{pmatrix} R_{1,1}^{\frac{1}{2}} & 0 & \cdots & & 0 \\ 0 & R_{1,2}^{\frac{1}{2}} & & & \vdots \\ \vdots & & \ddots & & \vdots \\ \vdots & & & R_{1,N_{Branch}-1}^{\frac{1}{2}} & 0 \\ 0 & \cdots & & 0 & R_{1,N_{Branch}}^{\frac{1}{2}} \end{pmatrix}$$

This completes the discussion of the first equation of (3), applied for MIMO/Rx diversity load estimation and or calibration.

Note that there are many variations on the above theme—the details depend on the antenna geometry and the transmission technology (e.g. polarization diversity).

APPENDIX B

The measurement of powers and modeling of measurement covariances here below are described for a single receiver branch. The reason is not to obscure the treatment with unnecessary detail when the measurement alternatives are discussed. The situation for multiple branches is discussed further below, where corresponding measurement alternatives are available.

An embodiment using both RTWP and RSEPS measurements is used as a model embodiment. Received total wideband power (RTWP(t)) and the received scheduled enhanced uplink power (RSEPS(t)) are assumed to be defined according to the 3GPP release 7 definitions. On top of this, proprietary measurements may be performed, immediately after of even before analogue to digital conversion.

Noting that the RSEPS measurement is expressed as a fraction of the RTWP measurement that is defined for joint measurement (defined on exactly the same time interval), it is clear that the measurement equation becomes nonlinear. The nonlinear measurement model is given by $$RSEPS^{measurement}(t) = q_{RSEPS}\left(10\log^{10}\left(\frac{x_{RSEPSPower}(t) + e_{RSEPSPower}(t)}{RTWP^{measurement}(t)}\right)\right). \qquad (B1)$$

Here $x_{RSEPSPower}(t)$ denotes the true power of the RSEPS quantity, $e_{RsEPSPower}(t)$ denotes the corresponding measurement uncertainty and $g_{RSEPS}(.)$ is the quantization function of the RSEPS measurement. The RTWP measurement is similarly defined, $$RTWP^{measurement}(t) = q_{RTWP}(10\log^{10}(x_{Residual}(t) + x_{RSEPSPower}(t) + e_{RTWP}(t) + 30)). \qquad (B2)$$

Where the RTWP is measured in dBm and where all power state variables are in Watts. The notation parallels that of the RSEPS measurement. The measurement disturbances are assumed to be zero mean, Gaussian and white, with $$E[e_{RSEPSPower}(t)]^2 = R_{2,RSEPSPower} \qquad (B3)$$

$$E[e_{RTWP}(t)]^2 = R_{2,RTWP} \qquad (B4)$$

The quantization is normally fine enough to be neglected. Here it is assumed that the quantization is neglected.

Note that the treatment of proprietary measurements of the total wideband power can be treated similarly as the RTWP measurement.

First, logarithmic relative measurements are described. In this embodiment, the original definition of (B1) is retained, with the quantization effects neglected. This gives, after a Taylor series expansion $$RSEPS^{log\ measurement}(t) \approx \qquad (B5)$$

$$10\log^{10}\left(\frac{x_{RSEPSPower}(t)}{x_{Residual}(t) + x_{RSEPSPower}(t)}\right) + e_{log\ RSEPSCompensated}(t),$$

where $$E[e_{logRSEPSCompensated}(t)]^2 \approx \qquad (B6)$$

$$\left(\frac{10}{\log(10)}\right)^2 \left(\left(\frac{1}{RTWP^{powermeasurement}(t)}\right)^2 R_{2,RTWP} + \left(\frac{1}{RSEPS^{powermeasurement}(t)}\right)^2 R_{2,RSEPSPower}\right).$$

Here $RTWP^{powermeasurement}(t)$ and $RSEPS^{powermeasurement}(t)$ are the artificial power measurements in watts, that result when (B2) and (B5) are solved for the state variables. A similar treatment of (B2) results in $$RTWP^{log\ measurement}(t) \approx 10\log^{10}(x_{RSEPSPower}(t) + x_{Residual}(t)) + 30 + e_{log\ RTWPcompensated}(t) \qquad (B7)$$

where $$E[e_{logRTWPCompensated}(t)]^2 \approx \qquad (B8)$$

$$\left(\frac{10}{\log(10)}\right)^2 \left(\left(\frac{1}{RTWP^{powermeasurement}(t)}\right)^2 R_{2,RTWP}\right).$$

Furthermore, the cross coupling becomes $$E\begin{bmatrix} e_{logRTWPCompensated}(t) \\ e_{log\ RSEPSPCompensated}(t) \end{bmatrix} \approx \qquad (B9)$$

$$-\left(\frac{10}{\log(10)}\right)^2 \left(\left(\frac{1}{RTWP^{powermeasurement}(t)}\right)^2 R_{2,RTWP}\right).$$

It follows that the measurement equations corresponding to (3) can be formulated as $$y(t) = c(x(t)) + e(t) \qquad (B10)$$

$$y(t) = \begin{pmatrix} RSEPS^{log\ measurement}(t) \\ RTWP^{log\ measurement}(t) \end{pmatrix} \qquad (B11)$$

$$c(x(t)) = \begin{pmatrix} 10\log^{10}\left(\frac{x_{RSEPSPower}(t)}{x_{RSEPSPower}(t) + x_{Residual}(t)}\right) \\ 10\log^{10}(x_{RSEPSPower}(t) + x_{Residual}(t)) + 30 \end{pmatrix} \qquad (B12)$$

$$e(t) = \begin{pmatrix} e_{logRSEPSCompensated}(t) \\ e_{logRTWPCompensated}(t) \end{pmatrix} \qquad (B13)$$

$$R_2(t) = \left(\frac{10}{\log(10)}\right)^2 \cdot \qquad (B14)$$

$$\begin{pmatrix} \left(\frac{1}{RSEPS^{powermeasurement}}\right) & \left(\frac{-1}{RTWP^{powermeasurement}(t)}\right) \\ 0 & \left(\frac{1}{RTWP^{powermeasurement}(t)}\right) \end{pmatrix}.$$

$$\begin{pmatrix} R_{2,RSEPSPower} & 0 \\ 0 & R_{2,RTWP} \end{pmatrix}.$$

$$\begin{pmatrix} \left(\frac{1}{RSEPS^{powermeasurement}}\right) & 0 \\ \left(\frac{-1}{RTWP^{powermeasurement}(t)}\right) & \left(\frac{1}{RTWP^{powermeasurement}(t)}\right) \end{pmatrix}.$$

Note again that the above assumes that there are no states that model dynamics in (B10)-(B14).

Now, Separated linear measurements are described. In this subsection, the measurements are first linearized. Towards that end it is assumed that $RTWP(t) \gg e_{RTWP}(t)$. This implies the following approximation of (B1), using a Taylor series expansion, $$RSEPS^{linearmeasurement}(t) \equiv \qquad (B15)$$

$$10^{\left(\frac{RSEPS^{linearmeasurement}(t)}{10}\right)} \approx \frac{x_{RSEPSPower}(t)}{x_{Residual}(t) + x_{RSEPSPower}(t)} +$$

$$\frac{e_{RSEPSPower}(t)}{x_{Residual}(t) + x_{RSEPSPower}(t)} - \frac{x_{RSEPSPower}(t)e_{RTWP}(t)}{(x_{Residual}(t) + x_{RSEPSPower}(t))^2}$$

which implies $$RSEPSPower^{measurement}(t) \equiv \qquad (B16)$$

$$(x_{Residual}(t) + x_{RSEPSPower}(t))RSEPS^{linearmeasurement}(t) \approx$$

$$x_{RSEPSPower}(t) + e_{RSEPSPower}(t) -$$

$$\frac{x_{RSEPSPower}(t)}{(x_{Residual}(t) + x_{RSEPSPower}(t))}e_{RTWP}(t) =$$

$$x_{RSEPSPower}(t) + e_{RSEPSPowerCompensated}(t).$$

Finally, assuming independence between the power noises, it follows that $$E[e_{RSEPSPowerCompensated}(t)]^2 \approx (RSEPS^{linearmeasurement}(t))^2 R_{2,RTWP} + R_{2,RSEPSPower}. \qquad (B17)$$

A similar treatment of (B2) results in $$RTWP^{linearmeasurement}(t) \equiv 10^{\left(\frac{RTWP^{measurement}(t)}{10}\right)} - 30 = \qquad (B18)$$

$$(x_{RSEPSPower}(t) + x_{Residual}(t)) + e_{RTWPlinear}(t)$$

Hence the variance of (B18), and the cross-coupling with (B16) becomes $$E[e_{RTWPlinear}(t)]^2 = R_{2,RTWP} \qquad (B19)$$

$$E[e_{RSEPSPowerCompensated}(t)e_{RTWPlinear}(t)]^2 = -(RSEPS^{linearmeasurement}(t))R_{2,RTWP}. \qquad (B20)$$

Next, using the artificial measurement defined by (B16)-(B20), it follows that the measurement equations corresponding to (3) can be formulated as $$y(t) = c(x(t)) + e(t) = C(t)x(t) + e(t) \tag{B21}$$

$$y(t) = \begin{pmatrix} RSEPSPower^{measurement}(t) \\ RTWP^{linearmeasurement}(t) \end{pmatrix} \tag{B22}$$

$$C(t) = \begin{pmatrix} 1 & 0 & \ldots & 0 & 0 & 0 & \ldots & 0 \\ 1 & 0 & \ldots & 0 & 1 & 0 & \ldots & 0 \end{pmatrix} \tag{B23}$$

$$e(t) = \begin{pmatrix} e_{RSEPSPowerCompensated}(t) \\ e_{RTWPlinear}(t) \end{pmatrix} \tag{B24}$$

$$R_2(t) = \begin{pmatrix} 1 & -RSEPS^{linearmeasurement}(t) \\ 0 & 1 \end{pmatrix} \cdot \tag{B25}$$

$$\begin{pmatrix} R_{2,RSEPSPower} & 0 \\ 0 & R_{2,RTWP} \end{pmatrix} \cdot \begin{pmatrix} 1 & 0 \\ -RSEPS^{linearmeasurement}(t) & 1 \end{pmatrix}.$$

The above equations define the linearized embodiment of the measurement process.

Now, relative linear measurements are described. In this embodiment, the original definition of (B1) is only transformed to the linear power domain, with the quantization effects neglected. This gives, after a Taylor series expansion $$RSEPS^{linearmeasurement}(t) \equiv \tag{B26}$$

$$10^{\left(\frac{RSEPS^{linearmeasurement(t)}}{10}\right)} \approx \frac{x_{RSEPSPower}(t)}{x_{Residual}(t) + x_{RSEPSPower}(t)} +$$

$$\frac{e_{RSEPSPower}(t)}{x_{Residual}(t) + x_{RSEPSPower}(t)} - \frac{x_{RSEPSPower}(t)e_{RTWP}(t)}{(x_{Residual}(t) + x_{RSEPSPower}(t))^2} \equiv$$

$$\frac{x_{RSEPSPower}(t)}{x_{Residual}(t) + x_{RSEPSPower}(t)} + e_{RSEPSCompensated}(t).$$

Here $$E[e_{RSEPSCompensated}(t)]^2 \approx \left(\frac{RSEPS^{linearmeasurement}(t)}{RTWP^{linearmeasurement}(t)}\right)^2 R_{2,RTWP} + \tag{B27}$$

$$\left(\frac{1}{RTWP^{linearmeasurement}(t)}\right)^2 R_{2,RSEPSPower}.$$

A similar treatment of (B2) results in $$RTWP^{linearmeasurement}(t) \equiv 10^{\left(\frac{RTWP^{measurement}(t)}{10}\right)} - 30 \tag{B28}$$

$$= (x_{RSEPSPower}(t) + x_{Residual}(t))$$

$$+ e_{RTWPlinear}(t)$$

Hence the variance of (B28), and the cross-coupling with (B26) becomes $$E[e_{RTWPlinear}(t)]^2 = R_{2,RTWP} \tag{B29}$$

$$E[e_{RSEPSCompensated}(t)e_{RTWPlinear}(t)]^2 = \tag{B30}$$

$$-\left(\frac{RSEPS^{linearmeasurement}(t)}{RTWP^{linearmeasurement}}\right) R_{2,RTWP}.$$

It follows that the measurement equations corresponding to (3) can be formulated as $$y(t) = c(x(t)) + e(t) \tag{B31}$$

$$y(t) = \begin{pmatrix} RSEPS^{linearmeasurement}(t) \\ RTWP^{linearmeasurement}(t) \end{pmatrix} \tag{B32}$$

$$c(x(t)) = \begin{pmatrix} \frac{x_{RSEPSPower}(t)}{x_{RSEPSPower}(t) + x_{Residual}(t)} \\ x_{RSEPSPower}(t) + x_{Residual}(t) \end{pmatrix} \tag{B33}$$

$$e(t) = \begin{pmatrix} e_{RSEPSCompensated}(t) \\ e_{RTWPlinear}(t) \end{pmatrix} \tag{B34}$$

$$R_2(t) = \left(\left(\frac{1}{RTWP^{linearmeasurement}}\right) \left(\frac{-RSEPS^{linearmeasurement}}{RTWP^{linearmeasurement}(t)}\right)\right) \cdot \tag{B35}$$

$$\begin{pmatrix} R_{2,RSEPSPower} & 0 \\ 0 & R_{2,RTWP} \end{pmatrix} \cdot \begin{pmatrix} \left(\frac{1}{RTWP^{linearmeasurement}}\right) & 0 \\ \left(\frac{-RSEPS^{linearmeasurement}}{RTWP^{linearmeasurement}(t)}\right) & 1 \end{pmatrix}.$$

There is a possibility to re-use the existing single-input solution of the load estimator, by changing the input signal from RTWP(t) to $$RSEPSPowerComplement(t) \equiv (1 - RSEPS^{linearmeasurement}(t)) RTWP^{linearmeasurement}(t). \tag{B36}$$

Note that two measurements are still needed, however these are combined prior to the processing of the Kalman filter. It is also possible to use the artificial nonlinear measurement $$RSEPSComplement(t) \equiv 1 - RSEPS^{linearmeasurement}(t). \tag{B37}$$

However, that measurement needs to be augmented with the RTWP measurement in the filtering in order to produce an absolute power value necessary for further processing.

The above follows since the two measurements reflect the fraction of the total power that is not scheduled enhance uplink power (B37), and the corresponding power (B36). This "trick" defines new artificial measurements that are approximations of the fractional residual power or the residual power itself. The details of the single input Kalman filter is Initialization (B38)

$$x^{RSEPC}(t_0 \mid t_0 - T) = x_0^{RSEPC}$$

$$P^{RSEPC}(t_0 \mid t_0 - T)$$

$$t := t_0 - T$$

Iteration $$t := t + T$$

$$K_f^{RSEPC}(t) = \frac{P^{RSEPC}(t \mid t - T)}{P^{RSEPC}(t \mid t - T) + R_2^{RSEPC}}$$

$$x^{RSEPC}(t \mid t) = x^{RSEPC}(t \mid t - T) + K_f^{RSEPC}(t)(y^{RSEPC}(t) - x^{RSEPC}(t \mid t - T))$$

$$P^{RSEPC}(t \mid t) = P^{RSEPC}(t \mid t - T) - K_f^{RSEPC}(t)P^{RSEPC}(t \mid t - T)$$

$$x^{RSEPC}(t + T \mid t) = x^{RSEPC}(t \mid t)$$

$$P^{RSEPC}(t + T \mid t) = P^{RSEPC}(t \mid t) + R_1^{RSEPC}$$

End.

In (B38) RSEPC is an abbreviation for RSEPSPower-Complement, cf. (B36). $x^{RSEPC}(t|t-T)$ denotes the one step prediction of the RSEPC while $x^{RSEPC}(t|t)$ is the Kalman filter estimate. The corresponding variances are $P^{RSEPC}(t|t-T)$ and $P^{RSEPC}(t|t)$, respectively. $K_f^{RSEPC}(t)$ is the time variable Kalman filter gain.

Now when the different options are presented in a more simple form, multiple receiver branch applications can be discussed. First, an embodiment using only RTWP measurements is presented. Here, complete measurement equations of (3), corresponding to the dynamic model (A1)-(A4) and (A13) are used, with the following modifications. The states corresponding to the RSEPS power are removed. The corresponding entries of the matrices A(t) and $R_1$ are removed. The states corresponding to the residual power are equal to states corresponding to the RTWP, i.e. the subscript "Residual" may be exchanged for "RTWP".

The results for all the measurement alternatives above are listed here.

Logarithmic Relative Measurement:

$$y(t) = \begin{pmatrix} RTWP_1^{logmeasurement}(t) \\ \vdots \\ RTWP_{N_{Branch}}^{logmeasurement}(t) \end{pmatrix} \tag{B39}$$

$$c(x(t)) = \begin{pmatrix} 10\log^{10}(x_{RTWP,1}(t)) + 30 \\ \vdots \\ 10\log^{10}(x_{RTWP,N_{Branch}}(t)) + 30 \end{pmatrix} \tag{B40}$$

$$e(t) = \begin{pmatrix} e_{logRTWPCompensated,1}(t) \\ \vdots \\ e_{logRTWPCompensated,N_{Branch}}(t) \end{pmatrix} \tag{B41}$$

$$R_{2,i}(t) = \left(\frac{10}{\log(10)}\right)^2 \frac{R_{2,RTWP,i}}{(RTWP^{powermeasurement}(t))^2}, \tag{B42}$$
$i = 1, \ldots, N_{Branch}$ $$R_2(t) = \begin{pmatrix} R_{2,1}(t) & & 0 \\ & \ddots & \\ 0 & & R_{2,N_{Branch}}(t) \end{pmatrix} \tag{B43}$$

Separated Linear Measurement:

In this case $c(x(t)) = C(t)x(t)$. The results become $$y(t) = \begin{pmatrix} RTWP^{linearmeasurement}(t) \\ \vdots \\ RTWP^{linearmeasurement}(t) \end{pmatrix} \tag{B44}$$

$C_i(t) = (1 \; 0 \; \ldots \; 0), i = 1, \ldots, N_{Branch}$ (B45)

$$C(t) = \begin{pmatrix} C_1(t) & & 0 \\ & \ddots & \\ 0 & & C_{N_{Branch}}(t) \end{pmatrix} \tag{B46}$$

$$e(t) = \begin{pmatrix} e_{RTWPlinear,1}(t) \\ \vdots \\ e_{RTWPlinear,N_{Branch}}(t) \end{pmatrix} \tag{B47}$$

$R_{2,i}(t) = R_{2,RTWP,i}, i = 1, \ldots, N_{Branch}$ (B48)

$$R_2(t) = \begin{pmatrix} R_{2,1} & & 0 \\ & \ddots & \\ 0 & & R_{2,N_{Branch}} \end{pmatrix}. \tag{B49}$$

Next, measurements of both RTWPs and RSEPS for multiple receiver branches are presented.

Logarithmic Relative Measurement:

$$y(t) = \begin{pmatrix} RSEPS_1^{logmeasurement}(t) \\ RTWP_1^{logmeasurement}(t) \\ \vdots \\ RSEPS_{N_{Branch}}^{logmeasurement}(t) \\ RTWP_{N_{bRANCH}}^{logmeasurement}(t) \end{pmatrix} \tag{B50}$$

$$c(x(t)) = \begin{pmatrix} 10\log^{10}\left(\frac{x_{RSEPSPower,1}(t)}{x_{RSEPSPower,1}(t) + x_{Residual,1}(t)}\right) \\ 10\log^{10}(x_{RSEPSPower,1}(t) + x_{Residual,1}(t)) + 30 \\ \vdots \\ 10\log^{10}\left(\frac{x_{RSEPSPower,N_{Branch}}(t)}{x_{RSEPSPower,N_{Branch}}(t) + x_{Residual,N_{Branch}}(t)}\right) \\ 10\log^{10}\left(x_{RSEPSPower,N_{Branch}}(t) + x_{Residual,N_{Branch}}(t)\right) + 30 \end{pmatrix} \tag{B51}$$

$$e(t) = \begin{pmatrix} e_{log\,RSEPSCompensated,1}(t) \\ e_{log\,RTWPCompensated,1}(t) \\ \vdots \\ e_{log\,RSEPSCompensated,N_{Branch}}(t) \\ e_{log\,RTWPCompensated,N_{Branch}}(t) \end{pmatrix} \tag{B52}$$

$$R_{2,i}(t) = \left(\frac{10}{\log(10)}\right)^2 \cdot \tag{B53}$$

$$\left(\begin{pmatrix} \left(\frac{1}{RSEPS_i^{powermeasurement}}\right) & \left(\frac{1}{RTWP_i^{powermeasurement}(t)}\right) \\ 0 & \left(\frac{1}{RTWP_i^{powermeasurement}(t)}\right) \end{pmatrix}\right).$$

$$\begin{pmatrix} R_{2,RSEPSPower} & 0 \\ 0 & R_{2,RTWP} \end{pmatrix}.$$

$$\left(\begin{pmatrix} \left(\frac{1}{RSEPS_i^{powermeasurement}}\right) & 0 \\ \left(\frac{-1}{RTWP_i^{powermeasurement}(t)}\right) & \left(\frac{1}{RTWP_i^{powermeasurement}(t)}\right) \end{pmatrix}\right),$$

$i = 1, \ldots, N_{Branch}$ $$R_2(t) = \begin{pmatrix} R_{2,1}(t) & & 0 \\ & \ddots & \\ 0 & & R_{2,N_{Branch}}(t) \end{pmatrix}. \tag{B54}$$

Separated Linear Measurement $$y(t) = \begin{pmatrix} RSEPSPower_1^{measurement}(t) \\ RTWP_1^{linearmeasurement}(t) \\ \vdots \\ RSEPSPower_{N_{Branch}}^{measurement}(t) \\ RTWP_{N_{Branch}}^{linearmeasurement}(t) \end{pmatrix} \tag{B55}$$

-continued $$C_i(t) = \begin{pmatrix} 1 & 0 & \cdots & 0 & 0 & 0 & \cdots & 0 \\ 1 & 0 & \cdots & 0 & 1 & 0 & \cdots & 0 \end{pmatrix},$$
$$i = 1, \ldots, N_{Branch}$$
(B56)

$$e(t) = \begin{pmatrix} e_{RSEPSPowerCompensated,1}(t) \\ e_{RTWPlinear,1}(t) \\ \vdots \\ e_{RSEPSPowerCompensated,N_{Branch}}(t) \\ e_{RTWPlinear,N_{Branch}}(t) \end{pmatrix}$$
(B57)

$$R_{2,i}(t) = \begin{pmatrix} 1 & -RSEPS_i^{linearmeasurement}(t) \\ 0 & 1 \end{pmatrix} \cdot \begin{pmatrix} R_{2,RSEPSPower,i} & 0 \\ 0 & R_{2,RTWP,i} \end{pmatrix}$$
$$\begin{pmatrix} 1 & 0 \\ -RSEPS_i^{linearmeasurement}(t) & 1 \end{pmatrix} i = 1, \ldots, N_{Branch}$$
(B58)

$$R_2(t) = \begin{pmatrix} R_{2,1}(t) & & 0 \\ & \ddots & \\ 0 & & R_{2,N_{Branch}}(t) \end{pmatrix}.$$
(B59)

Relative Linear Measurement $$y(t) = \begin{pmatrix} RSEPS_1^{linearmeasurement}(t) \\ RTWP_1^{linearmeasurement}(t) \\ \vdots \\ RSEPS_{N_{Branch}}^{linearmeasurement}(t) \\ RTWP_{N_{Branch}}^{linearmeasurement}(t) \end{pmatrix}$$
(B60)

$$c(x(t)) = \begin{pmatrix} \dfrac{x_{RSEPSPower,1}(t)}{x_{RSEPSPower,1}(t) + x_{Residual,1}(t)} \\ x_{RSEPSPower,1}(t) + x_{Residual,1}(t) \\ \vdots \\ \dfrac{x_{RSEPSPower,N_{Branch}}(t)}{x_{RSEPSPower,N_{Branch}}(t) + x_{Residual,N_{Branch}}(t)} \\ x_{RSEPSPower,N_{Branch}}(t) + x_{Residual,N_{Branch}}(t) \end{pmatrix}$$
(B61)

$$e(t) = \begin{pmatrix} e_{RSEPSCompensated}(t) \\ e_{RTWPlinear}(t) \\ \vdots \\ e_{RSEPSCompensated}(t) \\ e_{RTWPlinear}(t) \end{pmatrix}$$
(B62)

$$R_{2,i}(t) = \left( \begin{pmatrix} \dfrac{1}{RTWP_i^{linearmeasurement}} \\ 0 \end{pmatrix} \begin{pmatrix} \dfrac{-RSEPS_i^{linearmeasurement}}{RTWP_i^{linearmeasurement}(t)} \\ 1 \end{pmatrix} \right).$$
$$\begin{pmatrix} R_{2,RSEPSPower,i} & 0 \\ 0 & R_{2,RTWP,i} \end{pmatrix} \cdot \begin{pmatrix} \left(\dfrac{1}{RTWP_i^{linearmeasurement}}\right) & 0 \\ \left(\dfrac{-RSEPS_i^{linearmeasurement}}{RTWP_i^{linearmeasurement}(t)}\right) & 1 \end{pmatrix},$$
$$i = 1, \ldots, N_{Branch}$$
(B63)

$$R_2(t) = \begin{pmatrix} R_{2,1}(t) & & 0 \\ & \ddots & \\ 0 & & R_{2,N_{Branch}}(t) \end{pmatrix}.$$
(B64)

APPENDIX C

To describe the procedure of defining dynamics and measurement equations, assume for simplicity that no dynamics is included in the state model.

Define New States by:

$$\begin{pmatrix} x_1(t) \\ x_2(t) \end{pmatrix} = \begin{pmatrix} t_{11} & t_{12} \\ t_{21} & t_{23} \end{pmatrix} \begin{pmatrix} x_{RSEPSPower}(t) \\ x_{Residual}(t) \end{pmatrix}.$$
(C1)

Here $$T = \begin{pmatrix} t_{11} & t_{12} \\ t_{21} & t_{23} \end{pmatrix}$$
(C2)

is a non-singular transformation matrix. Note that when such a matrix has been defined, the states $$\begin{pmatrix} x_1(t) \\ x_2(t) \end{pmatrix}$$
(C3)

are used in the state model of the Kalman filter. New measurement equations are formed, corresponding to the alternatives discussed above, by inserting the relation $$\begin{pmatrix} x_{RSEPSPower}(t) \\ x_{Residual}(t) \end{pmatrix} = \begin{pmatrix} t_{11} & t_{12} \\ t_{21} & t_{23} \end{pmatrix}^{-1} \begin{pmatrix} x_1(t) \\ x_2(t) \end{pmatrix}$$
(C4)

In the measurement equations. The same procedure as outlined above, using Taylor series expansions, is then followed to arrive at the remaining quantities required for processing with the extended Kalman filter. The following are important special cases $$\begin{pmatrix} x_{RSEPSPowert}(t) \\ x_{RTWP}(t) \end{pmatrix} = \begin{pmatrix} 1 & 0 \\ 1 & 1 \end{pmatrix} \begin{pmatrix} x_{RSEPSPowert}(t) \\ x_{Residual}(t) \end{pmatrix}.$$
(C5)

$$\begin{pmatrix} x_{Residual}(t) \\ x_{RTWP}(t) \end{pmatrix} = \begin{pmatrix} 0 & 1 \\ 1 & 1 \end{pmatrix} \begin{pmatrix} x_{RSEPSPowert}(t) \\ x_{Residual}(t) \end{pmatrix}.$$
(C6)

APPENDIX D

The general extended Kalman filter is given by the following matrix and vector iterations, $$C(t) = \dfrac{\partial c(x)}{\partial x}\bigg|_{x=\hat{x}(t|t-T)}$$
(D1)

$$K_f(t) = P(t|t-T)C^T(t)(C(t)P(t|t-T)C^T(t) + R_2(t))^{-1}$$

$$\hat{x}(t|t) = \hat{x}(t|t-T) + K_f(t)(y(t) - C(t)\hat{x}(t|t-T))$$

$$P(t|t) = P(t|t-T) - K_f(t)C(t)P(t|t-T)$$

$$A(t) = \dfrac{\partial a(x)}{\partial x}\bigg|_{x=\hat{x}(t|t)}$$

$$\hat{x}(t|t-T) = Ax(t|t) + Bu(t)$$

$$P(t+T|t) = AP(t|t)A^T + R_1(t).$$

The quantities introduced by the filter iterations (D1) are as follows. $\hat{x}(t|t-T)$ denotes the state prediction, based on data up to time $t-T$, $\hat{x}(t|t)$ denotes the filter update, based on data up to time t, $P(t|t-T)$ denotes the covariance matrix of the state prediction, based on data up to time $t-T$, and $P(t|t)$ denotes the covariance matrix of the filter update, based on data up to time t. $C(t)$ denotes the linearized measurement matrix (linearization around most current state prediction), $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$.

The filter is initialized by providing initial values to $\hat{x}(t|t-T)$ and $P(t|t-T)$. Note that the total power pdf's of each receiver branch that is needed by the final RoT estimation step of load estimation algorithms, are obtained from the expected value of the output corresponding to the RTWP measurement as well as the expected covariance of the output corresponding to the RTWP measurement. This follows since approximate Gaussianity can be assumed. With the state selection as above with states for the residual power and the RSEPS power it immediately follows that $$x_{RTWP,i}(t) = x_{RSEPSPower,i}(t) + x_{Residual,i}(t) \tag{D2}$$

From which it follows that $$\hat{x}_{RTWP,i}(t|t) = \hat{x}_{RSEPSPower,i}(t|t) + \hat{x}_{Residual,i}(t|t) \tag{D3}$$

$$\hat{P}_{RTWP,i}(t|t) = \hat{P}_{RSEPSPower,i}(t|t) + \hat{P}_{RSEPSPower,Residual,i}(t|t) + \hat{P}_{Residual,RSEPSPower,i}(t|t) + \hat{P}_{Residual,i}(t|t). \tag{D4}$$

Note that further performance enhancements can be obtained by replacing the Kalman filter by a Kalman smoother.

REFERENCES

WO 2006/076969
WO 2007/024166
WO 2007/055626

The invention claimed is:

1. A method for providing load reference data in a CDMA wireless communication system with receiver diversity, comprising the steps of:
   measuring received total wideband power for at least a first receiver branch and a second receiver branch at a plurality of times;
   estimating, a plurality of times, a probability distribution for a first power quantity and a second power quantity, both being related to selected state variables of an estimation algorithm, from quantities representing said measured received total wideband power of said first receiver branch as well as of said second receiver branch using selected measurement functions of said selected state variables of said estimation algorithm;
   said selected state variables corresponding to cell power quantities;
   said selected measurement functions corresponding to said quantities representing said measured received total wideband power of said first and second receiver branches;
   computing a conditional probability distribution of a first noise floor measure based on at least a number of said estimated probability distributions for said first power quantity, and a conditional probability distribution of a second noise floor measure based on at least a number of said estimated probability distributions for said second power quantity; and
   providing load reference data based on said computed conditional probability distributions of said first and second noise floor measures.

2. The method of claim 1, wherein said estimation algorithm comprises a joint system noise covariance modeling correlation between said first and second receiver branches.

3. The method of claim 1, wherein said joint system noise covariance comprises at least one of spatial diversity covariance and polarization diversity covariance.

4. The method of claim 1, wherein said first and second receiver branches are utilized for multiple-input-multiple-output (MIMO) transmissions.

5. The method of claim 1, further comprising the step of:
   measuring a received common scheduled enhanced uplink power for said first and second receiver branches for said plurality of instances;
   whereby said step of estimating is based also on quantities representing said measured received common scheduled enhanced uplink power.

6. The method of claim 1, further comprising at least one of the steps:
   measuring received scheduled enhanced uplink power for said first receiver branch for said plurality of instances; and
   measuring received scheduled enhanced uplink power for said second receiver branch for said plurality of instances;
   whereby said step of estimating is based also on at least one of quantities representing said measured received scheduled enhanced uplink power for said first receiver branch and quantities representing said measured received scheduled enhanced uplink power for said second receiver branch.

7. The method of claim 6, wherein at least one of said first power quantity and said second power quantity is a measure of a difference between received total wideband power and received scheduled enhanced uplink power for said first and second receiver branch, respectively.

8. The method of claim 1, further comprising at least one of the steps:
   measuring received channel code powers for said first receiver branch for said plurality of instances; and
   measuring received channel code powers for said second receiver branch for said plurality of instances;
   whereby said step of estimating is based also on at least one of:
   quantities representing said measured received channel code powers for said first receiver branch and
   quantities representing said measured received channel code powers for said second receiver branch.

9. The method of claim 8, wherein at least one of said first power quantity and said second power quantity is a measure of a difference between received total wideband power and a sum of received channel code powers for said first and second receiver branch, respectively.

10. The method of claim 8, wherein said step of estimating comprises estimating, a plurality of times, a probability distribution for a third power quantity and a fourth power quantity, said third and fourth power quantity being a total wideband power quantity of said first and second receiver branch, respectively.

11. An arrangement for providing load reference data of a CDMA wireless communication system with receiver diversity, comprising:

one or more measuring circuits configured for obtaining at least quantities representing measures of received total wideband power for a first receiver branch at a plurality of times and quantities representing measures of received total wideband power for a second receiver branch at said plurality of times;

an estimation circuit configured for estimating, a plurality of times, a probability distribution for a first power quantity and a second power quantity, said estimation circuit being connected to said one or more measuring circuits;

said estimation circuit being arranged to operate with selected state variables of an estimation algorithm corresponding to cell power quantities, and with selected measurement functions corresponding to quantities representing said measured received total wideband power of said first receiver branch as well as of said second receiver branch;

said first and second power quantities being related to said selected state variables;

whereby said estimation circuit being arranged for estimating said probability distributions for said first and second power quantities using said selected measurement functions;

a computing circuit configured for computing a conditional probability distribution of a first noise floor measure and a conditional probability distribution of a second noise floor measure, said computing circuit being connected to said estimation circuit;

said computing circuit being arranged to operate on at least a number of said estimated probability distributions for said first power quantity and at least a number of said estimated probability distributions for said second power quantity; and a load circuit configured for providing load reference data based on said computed conditional probability distributions of said first and second noise floor measures, said load circuit being connected to at least said computing circuit.

12. The arrangement of claim 11, wherein said estimation circuit is arranged for incorporating a joint system noise covariance modeling correlation between said first and second receiver branches.

13. The arrangement of claim 11, wherein said joint system noise covariance comprises at least one of spatial diversity covariance and polarization diversity covariance.

14. The arrangement of claim 11, wherein the arrangement is configured for handling multiple-input-multiple-output transmissions.

15. The arrangement of claim 11, wherein said one or more measuring circuits are further arranged for obtaining quantities representing measures of a received common scheduled enhanced uplink power for said first and second receiver branches for said plurality of instances;

whereby said estimation circuit is arranged to operate also on said quantities representing said measures of a received common scheduled enhanced uplink power.

16. The arrangement of claim 11, wherein said one or more measuring circuits are further arranged for obtaining quantities representing measures of received scheduled enhanced uplink power for said first receiver branch for said plurality of instances, and quantities representing measures of received scheduled enhanced uplink power for said second receiver branch for said plurality of instances;

whereby said estimation circuit is arranged to operate also on at least one of said quantities representing said measures of received scheduled enhanced uplink power for said first receiver branch and said quantities representing said measures of received scheduled enhanced uplink power for said second receiver branch.

17. The arrangement of claim 16, wherein at least one of said first power quantity and said second power quantity is a measure of a difference between received total wideband power and received scheduled enhanced uplink power for said first and second receiver branch, respectively.

18. The arrangement of claim 1, wherein said one or more measuring circuits are further arranged for obtaining quantities representing measures of received channel code powers for said first receiver branch for said plurality of instances, and quantities representing measures of received channel code powers for said second receiver branch for said plurality of instances;

whereby said estimation circuit is arranged to operate also on at least one of said quantities representing said measures of received channel code powers for said first receiver branch and said quantities representing said measures of received channel code powers for said second receiver branch.

19. The arrangement of claim 18, wherein at least one of said first power quantity and said second power quantity is a measure of a difference between received total wideband power and a sum of received channel code powers for said first and second receiver branch, respectively.

20. The arrangement of claim 17, wherein said estimation circuit is further arranged for estimating, a plurality of times, a probability distribution for a third power quantity and a fourth power quantity, said third and fourth power quantity being a total wideband power quantity of said first and second receiver branch, respectively.

* * * * *

UNITED STATES PATENT AND TRADEMARK OFFICE
CERTIFICATE OF CORRECTION

PATENT NO. : 7,983,187 B2
APPLICATION NO. : 12/600671
DATED : July 19, 2011
INVENTOR(S) : Wigren Page 1 of 1

It is certified that error appears in the above-identified patent and that said Letters Patent is hereby corrected as shown below:

In Column 6, Line 48, delete "$C_{pole}$" and insert -- $C_{pole},$ --, therefor.

In Column 13, Line 41, delete "at least" and insert -- at at least --, therefor.

In Column 18, Line 65, delete "(shared))," and insert -- (shared), --, therefor.

In Column 22, Line 15, delete "(A12" and insert -- (A12) --, therefor.

In Column 23, Line 32, delete "$\mathbf{W}_{N_{Branch}}$" and insert -- $\mathbf{W}_{N_{Branch}}$ --, therefor.

In Column 23, Line 35, delete "$\mathbf{R}^{\frac{1}{2}}_{1,1}$" and insert -- $\mathbf{R}^{\frac{1}{2}}_{i,2}$ --, therefor.

In Column 24, Line 44, delete "$e_{RsEPSPower}(t)$" and insert -- $e_{RSEPSPower}(t)$ --, therefor.

In Column 24, Line 45, delete "$g_{RSEPS}(.)$" and insert -- $q_{RSEPS}(.)$ --, therefor.

In Column 24, Line 50, delete "$e_{RTWP}(t)+30$)"" and insert -- $e_{RTWP}(t))+30)$. --, therefor.

In Column 32, Line 64, delete "$\hat{x}(t\mid t-T)$" and insert -- $\hat{x}(t+T\mid t)$ --, therefor.

Signed and Sealed this
Twentieth Day of March, 2012

David J. Kappos
*Director of the United States Patent and Trademark Office*